US012304744B2

(12) United States Patent
Setterstrom et al.

(10) Patent No.: US 12,304,744 B2

(45) Date of Patent: May 20, 2025

(54) METHOD FOR ORIENTATION AND TRACKING OF WIRELESS CARGO DEVICES

(71) Applicant: GOODRICH CORPORATION, Charlotte, NC (US)

(72) Inventors: Kevin L. Setterstrom, Jamestown, ND (US); Scott P. Harms, Ypsilanti, ND (US); Aaron J. Roberts, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 882 days.

(21) Appl. No.: 17/507,621

(22) Filed: Oct. 21, 2021

(65) Prior Publication Data

US 2023/0125388 A1 Apr. 27, 2023

(51) Int. Cl.
*B64D 9/00* (2006.01)
*B65G 43/00* (2006.01)

(52) U.S. Cl.
CPC ...... *B65G 43/00* (2013.01); *B65G 2201/0235* (2013.01)

(58) Field of Classification Search
CPC ..... B65G 43/00; B64D 9/00; B64D 2009/006
See application file for complete search history.

(56) References Cited

U.S. PATENT DOCUMENTS 4,006,869 A * 2/1977 Vogele .................... B64C 1/20 414/679
8,220,750 B2 * 7/2012 Hettwer .................. B64D 9/00 244/137.1
8,308,107 B2 * 11/2012 Hettwer .................. B64D 9/00 244/118.1
8,788,085 B2 * 7/2014 Panzram ................. B64D 9/00 700/214
8,928,696 B1 1/2015 Yang
9,501,813 B2 11/2016 Tichauer et al.
10,005,564 B1 * 6/2018 Bhatia ...................... B64C 1/20
10,414,498 B2 * 9/2019 Harms .................... H04L 67/12
10,825,143 B2 11/2020 Balasubramanian et al.
2020/0057539 A1 * 2/2020 Balasubramanian ........................ G06F 3/04886
2020/0102076 A1 * 4/2020 Balasubramanian ........................ G06Q 10/0833
2020/0122835 A1 * 4/2020 Daw Perez ............... B64C 1/20
2020/0207475 A1 * 7/2020 Dobberfuhl ............ B65G 67/00
2021/0318668 A1 * 10/2021 Daw Perez .......... G05B 19/406
2022/0363392 A1 * 11/2022 Kieser ...................... B64D 9/00

* cited by examiner

*Primary Examiner* — Patrick H Mackey

(74) *Attorney, Agent, or Firm* — SNELL & WILMER L.L.P.

(57) ABSTRACT

A mobile cargo controller for a cargo handling system is disclosed, and may include an inertial measurement unit(s), a plurality of cargo zone selectors, a plurality of cargo zone indicators, and a cargo motion controller(s). Different combinations of one or more of the cargo zone selectors are activatable to correspond with different cargo zones of a cargo compartment (e.g., for an aircraft). Each cargo zone that is selected or activated through actuation of one or more of the cargo zone selectors activates each corresponding cargo zone indicator based upon a current orientation of the mobile cargo controller. As such, the particular cargo zone indicator(s) that is/are activated to identify a particular active cargo zone to an operator will differ for different orientations of the mobile cargo controller.

20 Claims, 32 Drawing Sheets

METHOD FOR ORIENTATION AND TRACKING OF WIRELESS CARGO DEVICES

FIELD

The present disclosure generally relates to the field of cargo handling systems and, more particularly, to hand-held controllers for such cargo handling systems.

BACKGROUND

As technology is expanding in the cargo aircraft industry, wireless devices are becoming more of a necessity. Numerous benefits have been identified with the addition of wireless cargo interfaces, one of them being the reduction of the number of operators that are needed to load and unload cargo. Operator reduction is achievable due to the ability for a single operator to position themselves freely wherever necessary during operations. However, when moving around the cargo compartment the orientation of the wireless device within the cargo compartment is constantly changing. This can cause the operator to be confused on which command is necessary to move cargo in a particular direction given their current orientation.

SUMMARY

A mobile cargo controller for a cargo handling system is presented herein. Both the configuration of such a mobile cargo controller and the operation, operational characteristics, and use of such a controller are within the scope of this Summary.

A mobile cargo controller for a cargo handling system of a first aspect includes an inertial measurement unit(s), a plurality of cargo zone selectors, a plurality of cargo zone indicators, and a cargo motion controller(s). Different combinations of one or more of the cargo zone selectors are activatable to correspond with different cargo zones of a cargo compartment (e.g., for an aircraft). Each cargo zone that is selected or activated through actuation of one or more of the cargo zone selectors activates each corresponding cargo zone indicator based upon a current orientation of the mobile cargo controller. As such, the particular cargo zone indicator(s) that is/are activated to identify a particular active cargo zone to an operator will differ for different orientations of the mobile cargo controller.

A mobile cargo controller for a cargo handling system of a second aspect includes at least one inertial measurement unit, a plurality of cargo zone selectors, a plurality of cargo zone indicators, and at least one cargo motion controller. Different combinations of one or more of the cargo zone selectors are activatable to correspond with different cargo zones of a cargo compartment (e.g., for an aircraft). Each cargo zone selector has its own cargo zone indicator, or stated another way each cargo zone selector has a dedicated cargo zone indicator.

A mobile cargo controller may be used to control a cargo handling system in a third aspect. A cargo zone may be selected from a plurality of cargo zone selectors that are presented on the mobile cargo controller. This selection defines or identifies a selected cargo zone (e.g., to the mobile cargo controller), where this selected cargo zone is based upon the orientation of the mobile cargo controller. For instance, the mobile cargo controller may incorporate at least one inertial measurement unit to allow the mobile cargo controller to determine its own orientation. A first combination of a plurality of cargo zone indicators on the mobile cargo controller are activated and that identifies the selected cargo zone (e.g., to a user or operator) based upon the orientation of the mobile cargo controller. Such a combination of cargo zone indicators includes at least one cargo zone indicator. At least one cargo motion controller may be operated to control motion of cargo within the selected cargo zone.

A plurality of cargo zone selectors incorporated by a mobile cargo controller may be characterized as separately actuatable actuators. Such an actuator may be in the form of a button (e.g., hardware) or may be a dedicated zone of a graphical user interface (e.g., an electronic button). A plurality of cargo zone indicators incorporated by a mobile cargo controller may be characterized as separately activatable light sources such as an LED or the like (e.g., hardware), or may be a dedicated zone of a graphical user interface (activation of such a dedicated zone on a graphical user interface (e.g., an icon) may be conveyed in any appropriate manner, such as changing from a "grayed out" condition to a "non-grayed out" condition).

A combination of cargo zone indicators incorporated by a mobile cargo controller and activated by actuation of a corresponding cargo zone selector incorporated by a mobile cargo controller may be determined by the then current orientation of the mobile cargo controller. Consider the case where the mobile cargo controller includes a first cargo zone selector and first cargo zone indicator (associated with a forward end of the mobile cargo controller), a second cargo zone selector and second cargo zone indicator (associated with a right side of the mobile cargo controller), a third cargo zone selector and third cargo zone indicator (associated with an aft or rear end of the mobile cargo controller), and a fourth cargo zone selector and fourth cargo zone indicator (associated with a left side of the mobile cargo controller). With the mobile cargo controller pointing toward the forward end of a cargo compartment (i.e., its forward end), the first cargo zone selector and second cargo zone selector may be actuated to select a forward-right cargo zone, and that will activate the first cargo zone indicator and the second cargo zone indicator. If the orientation of the mobile cargo controller is changed such that it now points to the right side of the cargo compartment, the mobile cargo controller may be configured such that the activated cargo zone indicators on the mobile cargo controller are automatically updated—the fourth cargo zone indicator will be activated (e.g., to the left of the operator, as the forward end of the cargo compartment is now to the left of the operator and the controller) and the first cargo zone indicator will be activated (in front of the operator, as the right side of the cargo compartment is now in front of the operator and the controller).

A cargo motion controller incorporated by a mobile cargo controller may be in the form of a single cargo motion controller, such as a joystick. Use of such a cargo motion controller may provide proportional velocity control, proportional directional control, or both. For instance and based upon the orientation of the mobile cargo controller, moving the joystick to the operator's right will move the associated cargo to the right in the active cargo zone, moving the joystick to the operator's left will move the associated cargo to the left in the active cargo zone, moving the joystick away from the operator will move the associated cargo away from the operator in the active cargo zone, and moving the joystick toward the operator will move the associated cargo toward the operator in the active cargo zone.

Various aspects of the present disclosure are also addressed by the following paragraphs and in the noted combinations:

1. A mobile cargo controller for a cargo handling system, comprising:

at least one inertial measurement unit;

a plurality of cargo zone selectors, wherein different combinations of one or more cargo zone selectors of said plurality of cargo zone selectors are activatable to correspond with different cargo zones of a cargo compartment;

a plurality of cargo zone indicators, wherein each said cargo zone selector of said plurality of cargo zone selectors has a corresponding cargo zone indicator of said plurality of cargo zone indicators; and at least one cargo motion controller.

2. The mobile cargo controller of paragraph 1, wherein said mobile cargo controller is a handheld device.

3. The mobile cargo controller of any of paragraphs 1-2, further comprising:

a wireless transceiver.

4. The mobile cargo controller of any of paragraphs 1-3, wherein said mobile cargo controller is configured for wireless communications.

5. The mobile cargo controller of any of paragraphs 1-4, wherein said at least one inertial measurement unit comprises at least one accelerometer and at least one gyroscope.

6. The mobile cargo controller of paragraph 5, wherein said at least one inertial measurement unit further comprises at least one magnetometer.

7. The mobile cargo controller of any of paragraphs 1-6, wherein said at least one cargo motion controller comprises a joystick.

8. The mobile cargo controller of any of paragraphs 1-7, wherein said at least one cargo motion controller comprises a single cargo motion controller.

9. The mobile cargo controller of any of paragraphs 1-8, wherein said at least one cargo motion controller is configured to provide proportional velocity control on a directional basis.

10. The mobile cargo controller of any of paragraphs 1-9, wherein each cargo zone selected through activation of one or more of said cargo zone selectors in turn activates each corresponding said cargo zone indicator based upon a current orientation of said mobile cargo controller.

11. The mobile cargo controller of any of paragraphs 1-10, wherein two said cargo zone selectors are activated to activate a single cargo zone located outside of a doorway zone.

12. The mobile cargo controller of paragraph 11, wherein said single cargo zone is selected from the group consisting of a forward-right cargo zone, a forward-left cargo zone, an aft-right cargo zone, and an aft-left cargo zone.

13. The mobile cargo controller of any of paragraphs 1-12, wherein each said cargo zone selector of said plurality of cargo zone selectors comprises a different actuator.

14. The mobile cargo controller of paragraph 13, wherein each said cargo zone selector of said plurality of cargo zone selectors comprises a different button.

15. The mobile cargo controller of any of paragraphs 1-14, wherein said plurality of cargo zone selectors comprises four said cargo zone selectors.

16. The mobile cargo controller of paragraph 15, wherein said plurality of cargo zone indicators comprises four said cargo zone indicators.

17. The mobile cargo controller of any of paragraphs 1-16, wherein each said cargo zone indicator comprises an LED.

18. The mobile cargo controller of any of paragraphs 1-17, further comprising:

an operation selector.

19. The mobile cargo controller paragraph 18, wherein said operation selector is selected from the group consisting of a scroll wheel or a slider.

20. The mobile cargo controller of any of paragraphs 18-19, further comprising:

a plurality of operation indicators, wherein said operation selector is used to select an operation associated with one of said plurality of operation indicators.

21. The mobile cargo controller of paragraph 20, wherein each operation indicator of said plurality of operation indicators comprises a separate LED.

22. The mobile cargo controller of any of paragraphs 20-21, wherein said plurality of operation indicators comprise a loading operation indicator and an unloading operation indicator.

23. The mobile cargo controller of any of paragraphs 1-22, further comprising:

a cargo rotation selector.

24. The mobile cargo controller of paragraph 23, wherein said cargo rotation selector comprises an actuator.

25. The mobile cargo controller of any of paragraphs 23-24, wherein said cargo rotation selector comprises a button.

26. The mobile cargo controller of any of paragraphs 23-25, further comprising:

a cargo rotation indicator.

27. The mobile cargo controller of paragraph 26, wherein said cargo rotation indicator comprises an LED.

28. The mobile cargo controller of any of paragraphs 23-27, wherein said cargo rotation selector is associated with control of a doorway zone.

29. The mobile cargo controller of any of paragraphs 1-28, further comprising:

a cargo lateral movement selector.

30. The mobile cargo controller of paragraph 29, wherein said cargo lateral movement selector comprises an actuator.

31. The mobile cargo controller of any of paragraphs 29-30, wherein said cargo lateral movement selector comprises a button.

32. The mobile cargo controller of any of paragraphs 29-31, further comprising:

a cargo lateral movement indicator.

33. The mobile cargo controller of paragraph 32, wherein said cargo lateral movement indicator comprises an LED.

34. The mobile cargo controller of any of paragraphs 29-33, wherein said cargo lateral movement selector is associated with control of a doorway zone.

35. A method of controlling a cargo handling system, said method comprising:

selecting a selected cargo zone from a plurality of cargo zone selectors presented on a mobile cargo controller, wherein said selecting is based upon a first orientation of said mobile cargo controller relative to said plurality of cargo zone selectors;

activating said selected cargo zone in response to said selecting;

activating a first combination of a plurality of cargo zone indicators on said mobile cargo controller to identify said selected cargo zone based upon said first orientation of said mobile cargo controller, wherein said first combination comprises at least one cargo zone indicator of said plurality of cargo zone indicators; and operating at least one cargo motion controller of said mobile cargo controller, wherein said operating controls motion of cargo within said selected cargo zone.

36. The method of paragraph 35, wherein said cargo handling system is an aircraft cargo handling system.

37. The method of any of paragraphs 35-36, wherein different combinations of one or more cargo zone selectors of said plurality of cargo zone selectors are activatable to correspond with different cargo zones of a cargo compartment.

38. The method of paragraph 37, wherein a first cargo zone selector of said plurality of cargo zone selectors is toward a forward end of said mobile cargo controller, wherein a second cargo zone selector of said plurality of cargo zone selectors is toward right side of said mobile cargo controller, wherein a third cargo zone selector of said plurality of cargo zone selectors is toward a rear end of said mobile cargo controller, and wherein a fourth cargo zone selector of said plurality of cargo zones is toward a left side of said mobile cargo controller.

39. The method of paragraph 37, wherein one of said plurality of cargo zone selectors corresponds with a forward direction for said first orientation of said mobile cargo controller, wherein another of said plurality of cargo zone selectors corresponds with a right direction for said first orientation of said mobile cargo controller, wherein another of said plurality of cargo zone selectors corresponds with a rearward direction for said first orientation of said mobile cargo controller, and wherein another of said plurality of cargo zone selectors corresponds with a left direction for said first orientation of said mobile cargo controller.

40. The method of paragraph 37, wherein a first cargo zone selector of said plurality of cargo zone selectors corresponds with a forward direction for said first orientation of said mobile cargo controller, wherein a second cargo zone selector of said plurality of cargo zone selectors corresponds with a right direction for said first orientation of said mobile cargo controller, wherein a third cargo zone selector of said plurality of cargo zone selectors corresponds with an aft direction for said first orientation of said mobile cargo controller, and wherein a fourth cargo zone selector of said plurality of cargo zones corresponds with a left direction for said first orientation of said mobile cargo controller, said method further comprising:

changing an orientation of said mobile cargo compartment from said first orientation to a second orientation; and activating a second combination of said plurality of cargo zone indicators to identify said selected cargo zone on said mobile cargo controller based upon said second orientation, wherein said second combination is different from said first combination and comprises at least one said cargo zone indicator of said plurality of cargo zone indicators.

41. The method of paragraph 40, wherein said plurality of cargo zone selectors consist essentially of said first cargo zone selector, said second cargo zone selector, said third cargo zone selector, and said fourth cargo zone selector.

42. The method of any of paragraphs 40-41, wherein said first cargo zone selector and said third cargo zone selector are oppositely disposed on said mobile cargo controller, and wherein said second cargo zone selector and said fourth cargo zone selector are oppositely disposed on said mobile cargo controller.

43. The method of paragraph 42, wherein said first cargo zone selector, said second cargo selector, said third cargo zone selector, and said fourth cargo zone selector are presented in this order on said mobile cargo controller and are disposed about a common location.

44. The method of paragraph 43, wherein said common location corresponds with a joystick, wherein said at least one cargo motion controller comprises said joystick.

45. The method of any of paragraphs 35-44, further comprising:

activating a cargo rotation selector on said mobile cargo controller, wherein said operating at least one cargo motion controller comprises rotating said cargo within a doorway zone.

46. The method of any of paragraphs 35-45, further comprising:

activating a cargo lateral movement selector on said mobile cargo controller, wherein said operating at least one cargo motion controller comprises moving said cargo from a first doorway zone to a second doorway zone.

47. The method of any of paragraphs 35-46, further comprising:

determining an orientation of said mobile cargo controller using at least one inertial measurement unit, wherein said mobile cargo controller comprises said at least one inertial measurement unit 48. The method of any of paragraphs 35-47, further comprising:

identifying a condition that is associated with a dropping of said mobile cargo controller; and at least temporarily deactivating a current cargo moving operation using said mobile cargo controller.

49. The method of paragraph 35, further comprising using the mobile cargo controller of any of paragraphs 1-34.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments in this Brief Description of the Drawings also applies to the corresponding discussion in the Detailed Description.

DETAILED DESCRIPTION

Figure 1A:
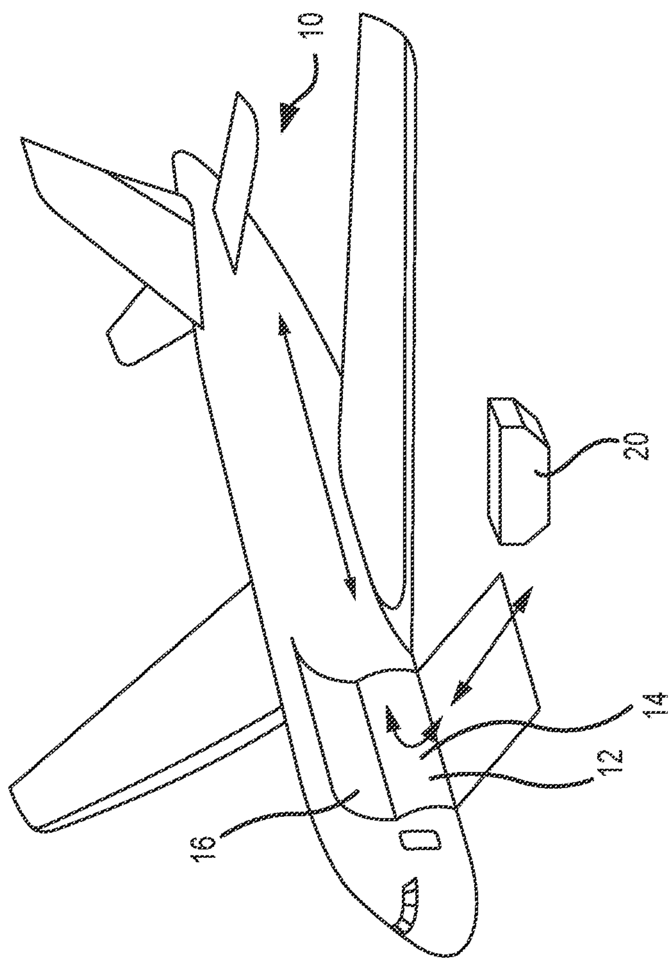
FIG. 1A illustrates a schematic of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
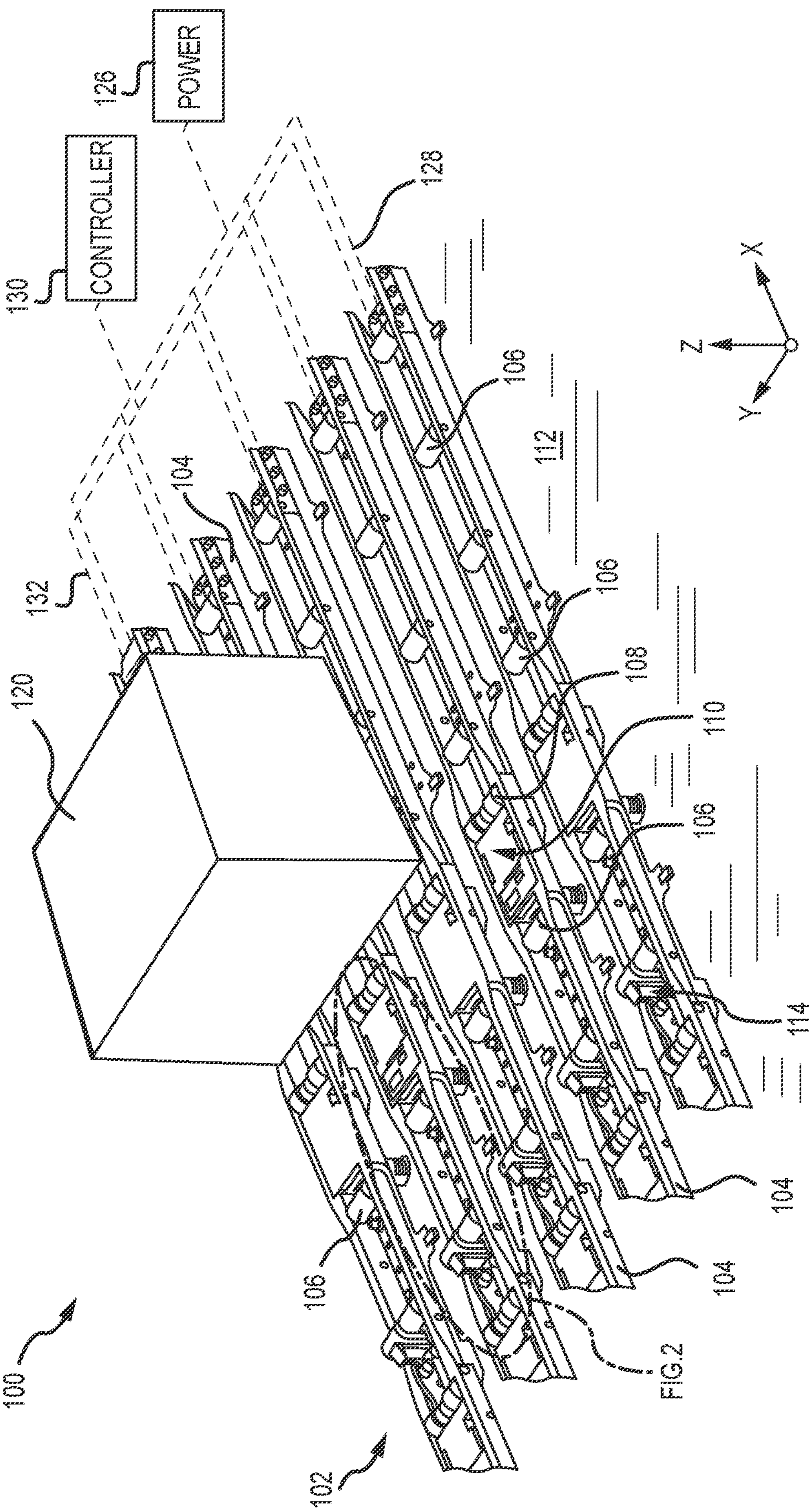
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or rollers 108 that may be actively powered by a motor. In various embodiments, one or more of the plurality of trays 104 is positioned longitudinally along the cargo deck 112—e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device 114 returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. The system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
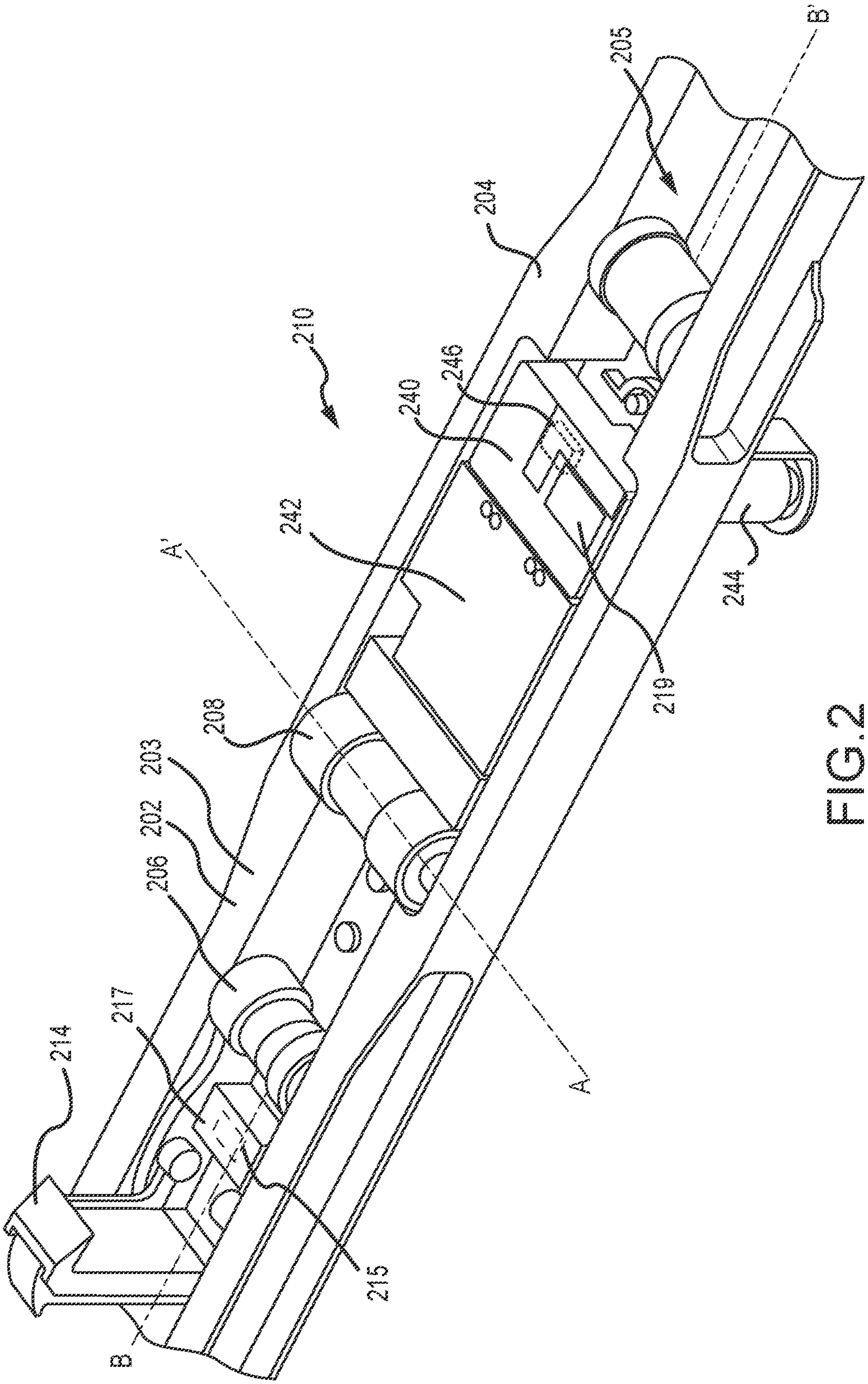
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
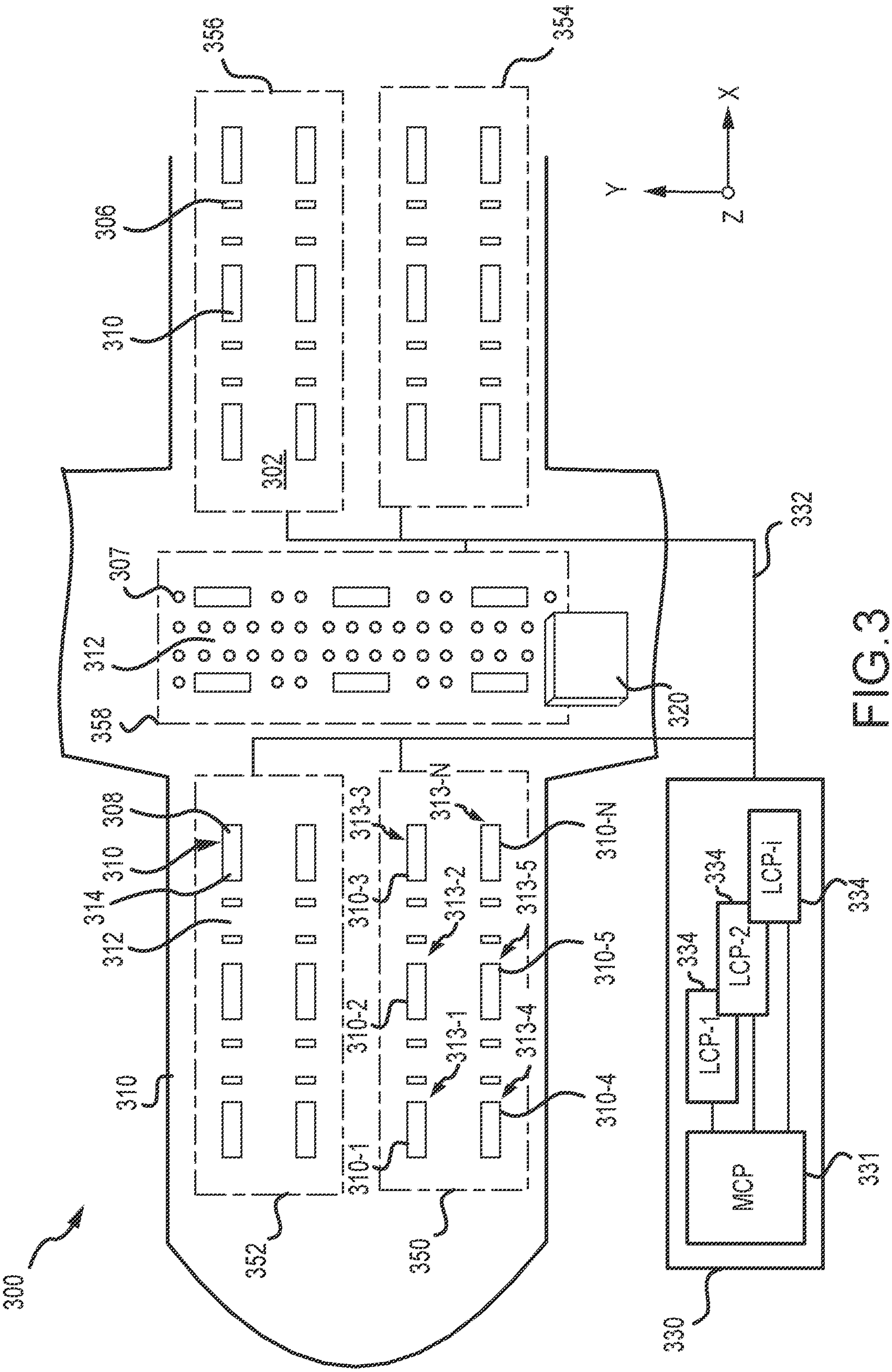
FIG. 3 illustrates a schematic view of a cargo deck having a cargo handling system with a plurality of PDUs, in accordance with various embodiments.

Referring now to FIG. 3, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 307 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 303-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

Figure 4A:
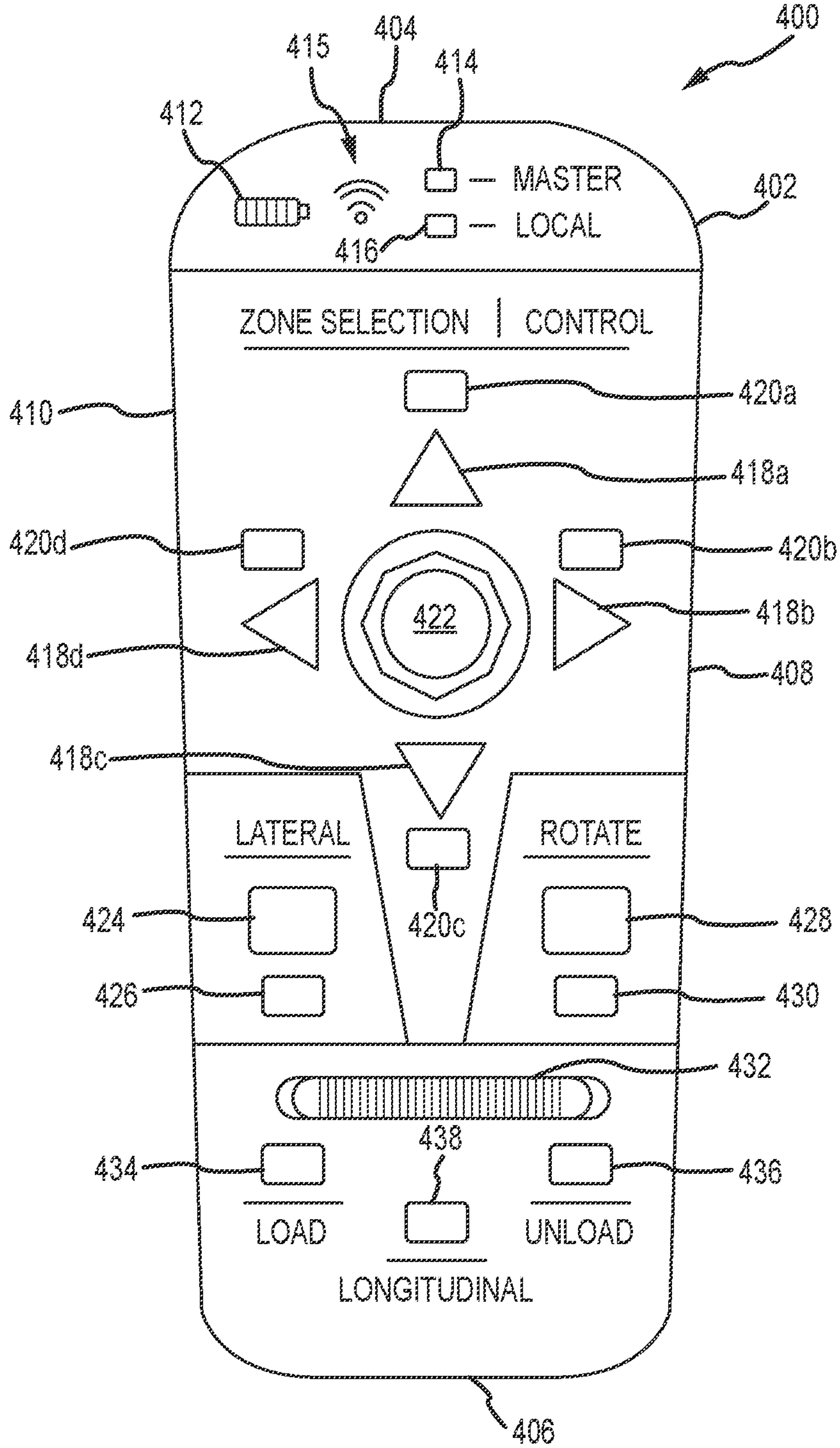
FIG. 4A is a top/plan view of a mobile cargo controller, in accordance with various embodiments.

FIG. 4A illustrates a mobile cargo controller for a cargo handling system, for instance in accordance with the foregoing, and that is identified by reference numeral 400. The mobile cargo controller 400 is a hand-held device, may be of any appropriate size, shape, and/or configuration, and includes a housing 402. This housing 402 (or more generally the mobile cargo controller 400) includes a forward end 404, an aft or rear end 406 that is oppositely disposed from the forward end 404 in a longitudinal dimension for the controller 400, a right side 408, and a left side 410 that is oppositely disposed from the right side 408 in a lateral dimension for the controller 400. The mobile cargo controller 400 also includes a battery indicator 412 (e.g., indicative of remaining battery power for the mobile cargo controller 400), a master controller indicator 414 (indicating, when activated, that the mobile cargo controller 400 is communicating with a master controller of a cargo handling system), a local controller indicator 416 (indicating, when activated, that the mobile cargo controller 400 is communicating with a local controller of a cargo handling system), and a wireless connection indicator 415 (indicating, when activated, that the mobile cargo controller 400 is in wireless communication with a master controller and/or a local controller). Each of the indicators 412, 414, 415, and 416 may be an activatable light source of any appropriate type, such as an LED.

The mobile cargo controller 400 includes selectors for selecting a plurality of different cargo zones (four being illustrated, although the mobile cargo controller 400 may be configured for any appropriate number of cargo zones). The noted cargo zone selectors include a cargo zone selector 418*a*, a cargo zone selector 418*b*, a cargo zone selector 418*c*, and a cargo zone selector 418*d*, with the cargo zone selectors 418*a* and 418*c* being oppositely disposed and spaced in the longitudinal dimension of the mobile cargo controller 400, and with the cargo zone selectors 418*b* and 418*d* being oppositely disposed and spaced in the lateral dimension of the mobile cargo controller 400. The cargo zone selector 418*a* may be characterized as being associated with the forward end 404 of the mobile cargo controller 400; the cargo zone selector 418*b* may be characterized as being associated with the right side 408 of the mobile cargo controller 400; the cargo zone selector 418*c* may be characterized as being associated with the aft or rear end 406 of the mobile cargo controller 400; and the cargo zone selector

418*d* may be characterized as being associated with the left side 410 of the mobile cargo controller 400. Each cargo zone selector 418*a*-418*d* may be characterized as an actuator, for instance a button. One or more of the cargo zone selectors 418*a*-418*d* may be used to select a particular cargo zone or combination of cargo zones in a cargo compartment and in a manner that will be discussed in more detail below. One actuation of a given cargo zone selector 418*a*-418*d* may be for activation of the same, and a subsequent actuation of a given cargo zone selector 418*a*-418*d* may be for an inactivation of the same.

The mobile cargo controller 400 includes a plurality of different cargo zone indicators. The noted cargo zone indicators include a cargo zone indicator 420*a*, a cargo zone indicator 420*b*, a cargo zone indicator 420*c*, and a cargo zone indicator 420*d*, with the cargo zone indicators 420*a* and 420*c* being oppositely disposed and spaced from one another in the longitudinal dimension of the controller 400, and with the cargo zone indicators 420*b* and 420*d* being oppositely disposed and spaced from one another in the lateral dimension for the controller 400. The cargo zone indicator 420*a* may be characterized as being associated with both the forward end 404 of the mobile cargo controller 400 and the cargo zone selector 418*a*; the cargo zone indicator 420*b* may be characterized as being associated with both the right side 408 of the mobile cargo controller 400 and the cargo zone selector 418*b*; the cargo zone indicator 420*c* may be characterized as being associated with both the aft or rear end 406 of the mobile cargo controller 400 and the cargo zone selector 418*c*; and the cargo zone indicator 420*d* may be characterized as being associated with both the left side 410 of the mobile cargo controller 400 and the cargo zone selector 418*d*. Each cargo zone indicator 420*a*-420*d* may be an activatable light source of any appropriate, such as an LED.

The cargo zone indicator 420*a* may be disposed in proximity to the cargo zone selector 418*a* and may be activated by actuation of the cargo zone selector 418*b*; the cargo zone indicator 420*b* may be disposed in proximity to the cargo zone selector 418*b* and may be activated by actuation of the cargo zone selector 418*b*; the cargo zone indicator 420*c* may be disposed in proximity to the cargo zone selector 418*c* and may be activated by actuation of the cargo zone selector 418*c*; and the cargo zone indicator 420*d* may be disposed in proximity to the cargo zone selector 418*d* and may be activated by actuation of the cargo zone selector 418*d*. As will be discussed in more detail below, an operator may actuate any one or more of the cargo zone selectors 418*a*-418*d* and with the mobile cargo controller 400 being in a certain orientation at the time of this activation (and that will activate the corresponding cargo zone indicator(s) 420*a*-420*d*). It may be that two of the cargo zone selectors 418*a*-418*d* will be actuated to select a particular cargo zone. The cargo zone selectors 418*a*-418*d* that are initially activated will be in relation to the direction that the forward end 414 of the mobile cargo controller 400 is facing (and presumably the operator), and again will activate the corresponding cargo zone indicator(s) 420*a*-420*d*. If the mobile cargo controller 400 is moved and now "points" in a different direction (e.g., the forward end 404 is now facing in a different direction), the activated cargo zone indicator(s) 420*a*-420*d* will change accordingly—the active/selected cargo zone(s) will be presented on the mobile cargo controller 400 (by activation of the relevant cargo zone indicator(s) 420*a*-420*d*) in relation to the direction that the forward end 414 of the mobile cargo controller 400 is facing (and presumably the operator).

The mobile cargo controller 400 further includes a cargo motion controller 422, which may be in the form of a joystick, and that may provide at least one of proportional directional and/or proportional velocity control. The cargo zone selectors 418*a*-418*d* may be collectively disposed about the cargo motion controller 422, as may the cargo zone indicators 420*a*-420*d*. Other components of the mobile cargo controller 400 include the following, and will be discussed in more detail below with regard to use/operation of the controller 400: 1) a cargo lateral movement selector 424 (e.g., an actuator; a button); 2) a cargo lateral movement indicator 426; 3) a cargo rotation selector 428 (e.g., an actuator; a button); 4) a cargo rotation indicator 430; 5) an operation selector 432 (e.g., a scroll wheel, slider, or the like); 6) a loading operation indicator 434; 7) an unloading operation indicator 436; and 8) a longitudinal indicator 438. Each of the indicators 426, 430, 434, 436, and 438 may be a light source of any appropriate type, such as an LED.

Figure 4C:
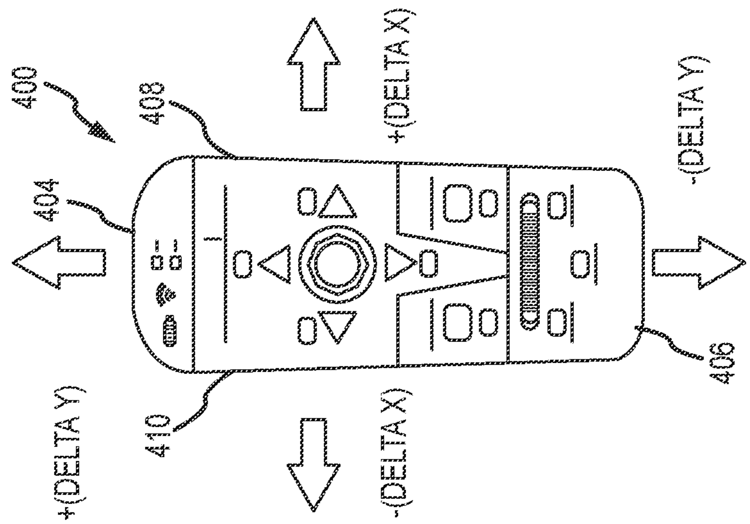
FIG. 4C schematically illustrates positional tracking of the mobile cargo controller of FIG. 4A using at least one inertial measurement unit, in accordance with various embodiments.
Figure 4B:
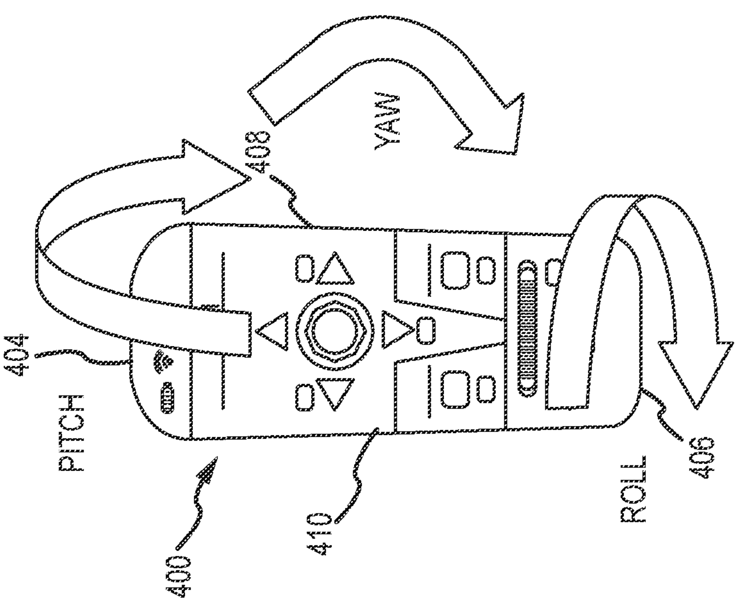
FIG. 4B schematically illustrates orientation tracking of the mobile cargo controller of FIG. 4A using at least one inertial measurement unit, in accordance with various embodiments.
Figure 4D:
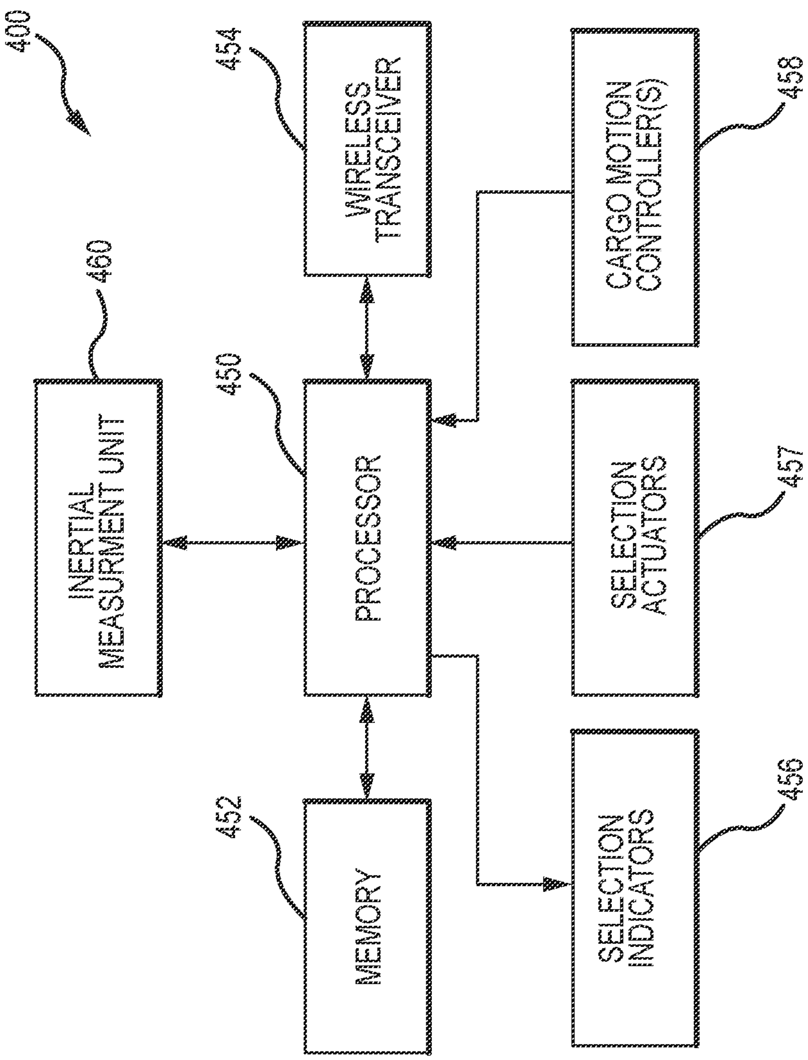
FIG. 4D is a functional schematic of the mobile cargo controller of FIG. 4A, in accordance with various embodiments.

The mobile cargo controller 400 includes at least one inertial measurement unit (IMU). FIG. 4B schematically illustrates IMU orientation tracking for the mobile cargo controller 400, while FIG. 4C schematically illustrates IMU positional tracking for the mobile cargo controller 400. A functional schematic of the mobile cargo controller 400 is presented in FIG. 4D. The mobile cargo controller 400 includes one or more processors 450 and that may utilize any appropriate processing arrangement/architecture, memory 452, a wireless transceiver 454, a plurality of selection indicators 456 (e.g., cargo zone indicators 420*a*-420*d*; cargo lateral movement indicator 426; cargo rotation indicator 430; loading operation indicator 434; unloading operation indicator 436; longitudinal indicator 438), a plurality of selection actuators 457 (e.g., cargo zone selectors 418*a*-418*d*; cargo lateral movement selector 424; cargo rotation selector 428; operation selector 432), one or cargo motion controllers 458 (e.g., cargo motion controller 422), and one or more inertial measurement units 460.

Figure 4E:
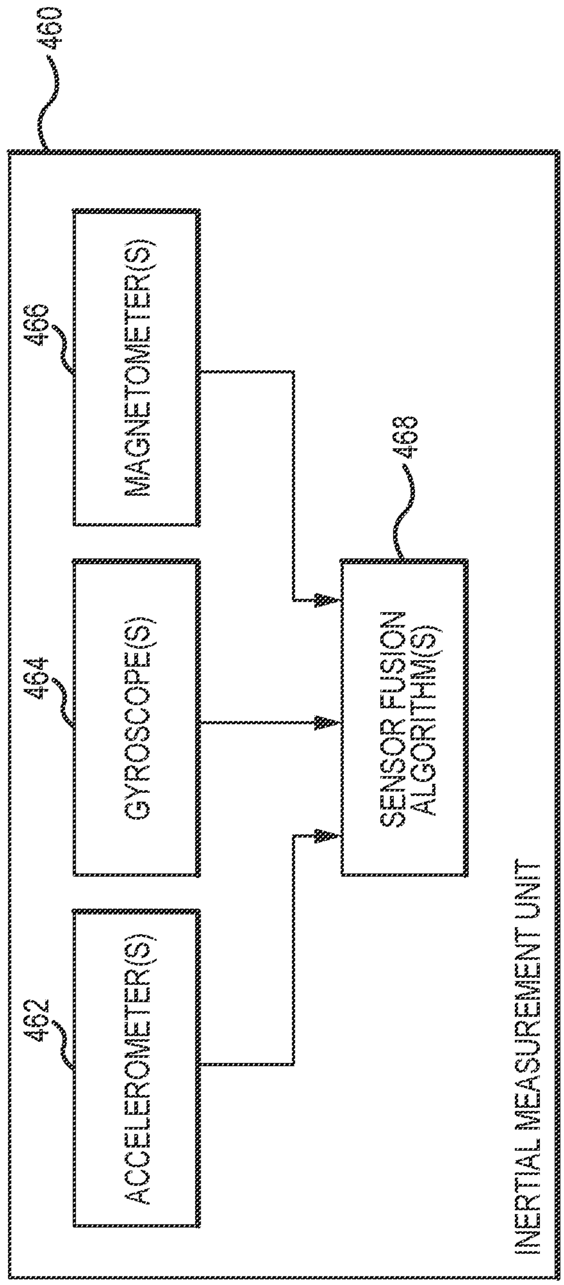
FIG. 4E is a functional schematic of an inertial measurement unit used by the mobile cargo controller of FIG. 4A, in accordance with various embodiments.

FIG. 4E is a functional schematic of an inertial measurement unit 460 that may be used by the mobile cargo controller 400. The IMU 460 includes one or more accelerometers 462, one or more gyroscopes 464, and optionally one or more magnetometers 466. Output from these sensors 462, 464, and 466 may be output to and used by one or more sensor fusion algorithms 468 to determine the orientation of the mobile cargo controller 400 in space. The IMU(s) 460 used by the mobile cargo controller 400 can also be used to determine when the mobile cargo controller 400 has been dropped (e.g., via detecting a sudden change in position and orientation). Such a detected drop may be used to at least temporarily deactivate the current cargo operation (e.g., an ongoing operation of the cargo motion controller 422).

In various embodiments, memory 452 is configured to store information used in running the mobile cargo controller 400. In various embodiments, memory 452 comprises a computer-readable storage medium, which, in various embodiments, includes a non-transitory storage medium. In various embodiments, the term "non-transitory" indicates that the memory 452 is not embodied in a carrier wave or a propagated signal. In various embodiments, the non-transitory storage medium stores data that, over time, changes (e.g., such as in a random access memory (RAM) or a cache memory). In various embodiments, memory 452 comprises a temporary memory. In various embodiments, memory 452 comprises a volatile memory. In various embodiments, the volatile memory includes one or more of RAM, dynamic RAM (DRAM), static RAM (SRAM), and/or other forms of volatile memories. In various embodiments, memory 452 is configured to store computer program instructions for execution by processor 450. In various embodiments, applications and/or software running on mobile cargo controller 400 utilize(s) memory 452 in order to temporarily store information used during program execution. In various embodiments, memory 452 includes one or more computer-readable storage media. In various embodiments, memory 452 is configured to store larger amounts of information than volatile memory. In various embodiments, memory 452 is configured for longer-term storage of information. In various embodiments, memory 452 includes non-volatile storage elements, such as, for example, electrically programmable memories (EPROM), electrically erasable and programmable (EEPROM) memories, flash memories, floppy discs, magnetic hard discs, optical discs, and/or other forms of memories.

In various embodiments, processor 450 is configured to implement functionality and/or process instructions. In various embodiments, processor 450 is configured to process computer instructions stored in memory 452. In various embodiments, processor 450 includes one or more of a microprocessor, a controller, a digital signal processor (DSP), an application specific integrated circuit (ASIC), a field-programmable gate array (FPGA), or other equivalent discrete or integrated logic circuitry.

System program instructions and/or processor instructions may be loaded onto memory 452. The system program instructions and/or processor instructions may, in response to execution by operator, cause processor 450 to perform various operations. In particular, and as described in further detail below, the instructions may allow processor 450 to determine the orientation of the mobile cargo controller 400. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Figure 5:
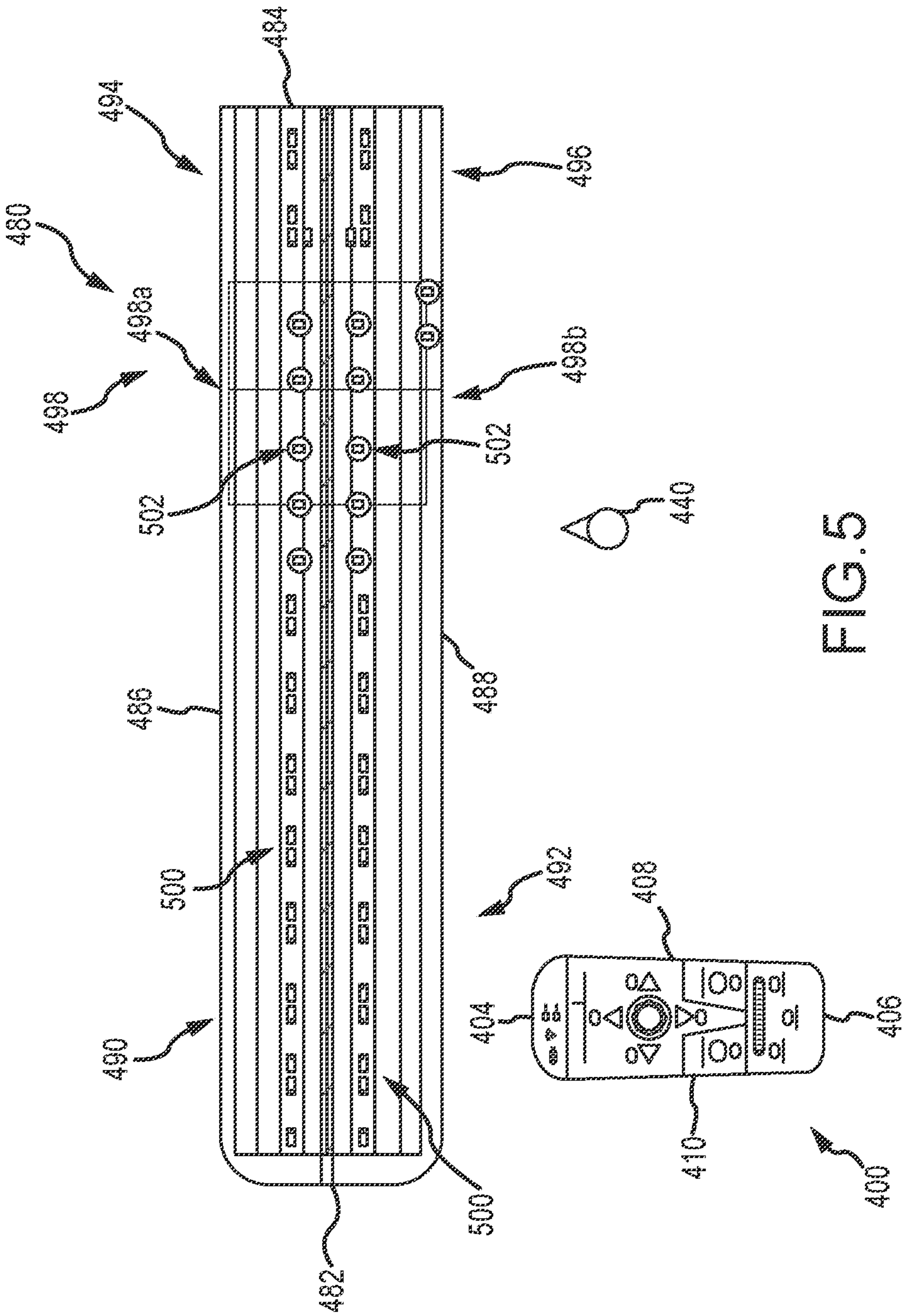
FIG. 5 illustrates the mobile cargo controller of FIG. 4A in relation to a cargo compartment, in accordance with various embodiments.

FIG. 5 illustrates a mobile cargo controller 400 in relation to a representative cargo compartment 480 (e.g., for an aircraft). The deck of the cargo compartment 480 may include a plurality of PDUs 500 (e.g., for advancing cargo along an at least generally axial/linear path), as well as a plurality of freighter common turntables or FCTs 502 that are a specific type of PDU (having the ability to axially advance associated cargo, as well as to rotate associated cargo). The FCTs 502 are disposed in a doorway zone 498 of the cargo compartment 480.

Continuing to refer to FIG. 5, a mobile cargo controller orientation indicator 440 indicates the direction that the forward end 404 of the mobile cargo controller 400 is facing, projecting, or pointing in FIG. 5, as well as in FIGS. 6A-14E (hereafter "pointing" alone may be used with regard to the forward end 404 of the mobile cargo controller 400). The cargo compartment 480 is defined by a forward end 482, an aft or rear end 484 that is spaced from the forward end 482 along a length (or longitudinal) dimension of the cargo compartment 480, a right side 486, and a left side 488 that is spaced from the right side 486 along a width (or lateral) dimension of the cargo compartment 480. The cargo compartment 480 may be characterized as including a plurality of separate cargo zones, including a forward-right cargo zone 490, a forward-left cargo zone 492, an aft-right cargo zone 494, and an aft-left cargo zone 496. The cargo compartment 480 may also be characterized as including a doorway zone 498 (e.g., for loading cargo into and unloading cargo from the cargo compartment 480) that is disposed between a forward cargo compartment (collectively cargo zones 490, 492) and an aft cargo compartment (collectively cargo zones 494, 496). The doorway zone 498 may be further defined as including a right doorway zone 498*a* and a left doorway zone 498*b*.

Figure 6A:
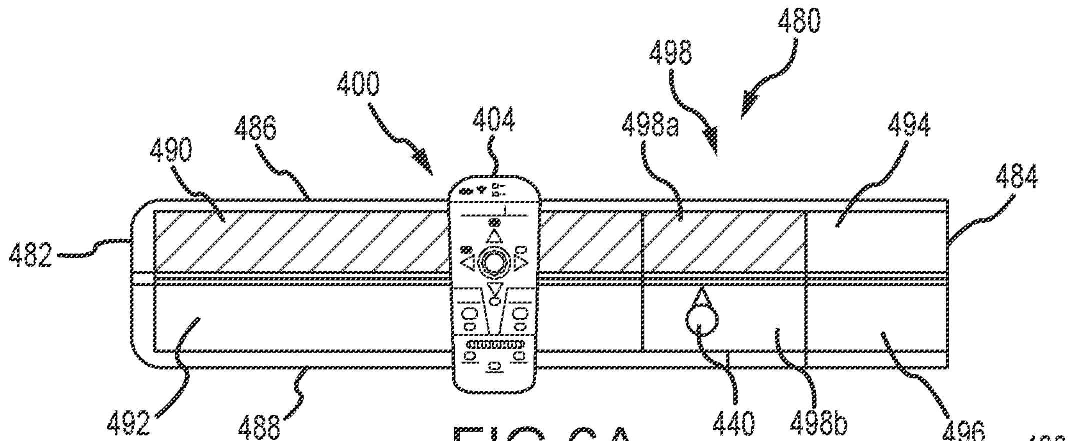
FIG. 6A illustrates active cargo zone indicators for an activated forward-right cargo zone and one orientation of the mobile cargo controller of FIG. 4A, in accordance with various embodiments.

FIGS. 6A-6G illustrate one or more features pertaining to the mobile cargo controller 400 and including the use/operation thereof (e.g., selection of cargo zones within the cargo compartment 480), the view of the controller 400 being enlarged for clarity (as well as in FIGS. 7A-14E, addressed below). In FIG. 6A, the mobile cargo controller 400 has its forward end 404 pointing toward the right side 486 of the cargo compartment 480. In order to select or activate the forward-right cargo zone 490, the cargo zone selectors 418*a*, 418*d* have each been actuated and that activates the corresponding cargo zone indicators 420*a*, 420*d* (the cargo zone indicator 420*a* being closest to the right side 486 of the cargo compartment 480 (or the right side 486 being in front of the mobile cargo controller 400), and the cargo zone indicator 420*d* being closest to the forward end 482 of the cargo compartment 480 (or the forward end 482 being to the left of the mobile cargo controller 400)). Selection of the forward-right cargo zone 490 in this manner could also automatically select right doorway zone 498*a* as shown in FIG. 6A or alternatively could activate both the right doorway zone 498*a* and the left doorway zone 498*b* (not shown).

Figure 6B:
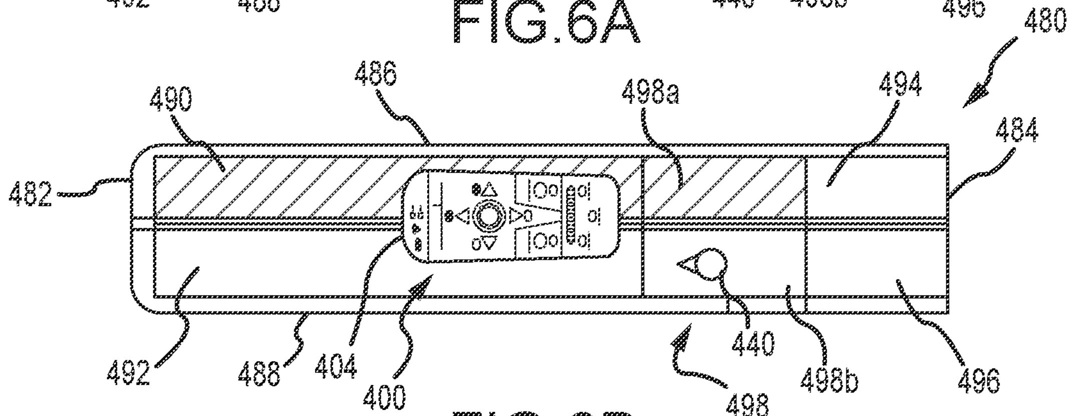
FIG. 6B illustrates active cargo zone indicators for an activated forward-right cargo zone and for another orientation of the mobile cargo controller of FIG. 4A (compared to FIG. 6A), in accordance with various embodiments.

In FIG. 6B the forward-right cargo zone 490 is still the active cargo zone from FIG. 6A, but the orientation of the mobile cargo controller 400 has been changed from that shown in FIG. 6A. The forward end 404 of the mobile cargo controller 400 now points toward forward end 482 of the cargo compartment 480. Note that this change in orientation of the mobile cargo controller 400 continues to identify to the operator that the forward-right cargo zone 490 is still the active cargo zone by a simple viewing of the mobile cargo controller 400, namely by the cargo zone indicator 420*a* and the cargo zone indicator 420*b* now being activated to correctly identify the forward-right cargo zone 490 as the active cargo zone (the cargo zone indicator 420*a* being closest to the forward end 482 of the cargo compartment 480 (or the forward end 482 being in front of the mobile cargo controller 400), and the cargo zone indicator 420*b* being closest to the right side 486 of the cargo compartment 480 (or the right side 486 being to the right of the mobile cargo controller 400)).

Figure 6C:
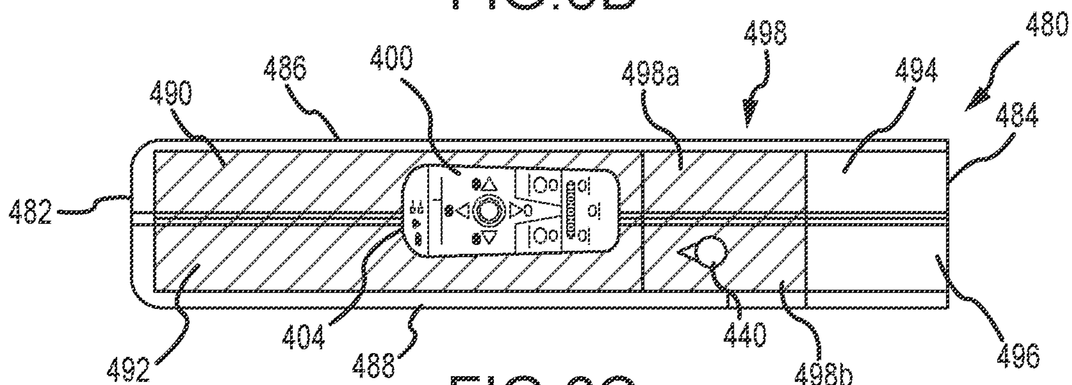
FIG. 6C illustrates active cargo zone indicators for an activated forward-right cargo zone and an activated forward-left cargo zone and for one orientation of the mobile cargo controller of FIG. 4A, in accordance with various embodiments.

In FIG. 6C, the mobile cargo controller 400 continues to have its forward end 404 pointing toward the forward end 482 of the cargo compartment 480 and in accord with FIG. 6B. In order to select or activate the forward-right cargo zone 490 and the forward-left cargo zone 492, the cargo zone selectors 418*a*, 418*b*, and 418*d* have each been actuated and that activates the corresponding cargo zone indicators 420*a*, 420*b*, and 420*d* (the cargo zone indicator 420*a* being closest to the forward end 482 of the cargo compartment 480 (or the forward end 482 being in front of the mobile cargo controller 400), the cargo zone indicator 420*b* being closest to the right side 486 of the cargo compartment 480 (or the right side 486 being to the right of the mobile cargo controller 400), and the cargo zone indicator 420*d* being closest to the left side 488 of the cargo compartment 480 (or the left side 488 being to the left of the mobile cargo controller 400)). Selection of the forward-right cargo zone 490 and the forward-left cargo zone 492 in this manner could also automatically select right doorway zone 498*a* and the left doorway zone 498*b* as shown in FIG. 6C.

Figure 6D:
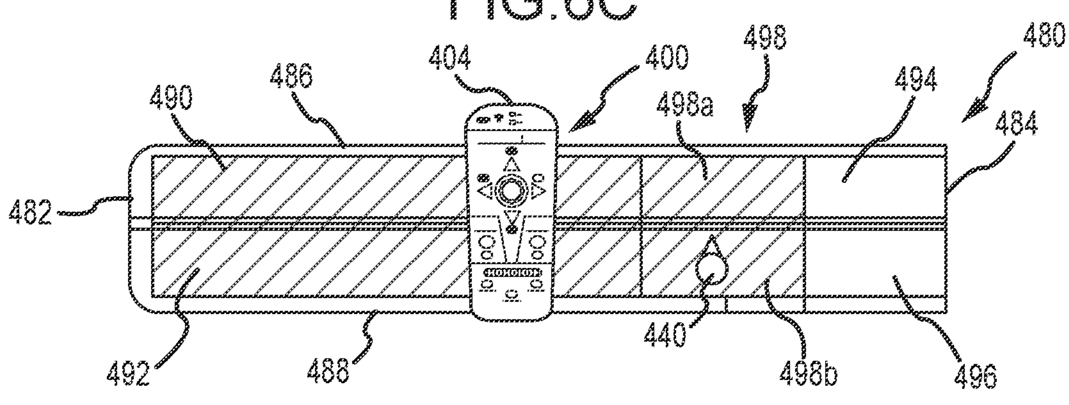
FIG. 6D illustrates active cargo zone indicators for an activated forward-right cargo zone and an activated forward-left cargo zone and for another orientation of the mobile cargo controller of FIG. 4A (compared to FIG. 6C), in accordance with various embodiments.

In FIG. 6D the orientation of the mobile cargo controller 400 has been changed from that shown in FIG. 6C, with the forward end 404 of the mobile cargo controller 400 now pointing toward the right side 486 of the cargo compartment 480. Note that this change in orientation of the mobile cargo controller 400 still identifies to the operator that the forward-right cargo zone 490 and forward-left cargo zone 492 are still the active cargo zones by simply viewing the mobile cargo controller 400, namely by the cargo zone indicators 420*a*, 420*d*, and 420*c* now being activated to correctly identify the forward-right cargo zone 490 and forward-left cargo zone 492 as the active cargo zones (the cargo zone indicator 420*a* being closest to the right side 486 of the cargo compartment 480 (or the right side 486 being in front of the mobile cargo controller 400), the cargo zone indicator 420*d* being closest to the forward end 482 of the cargo compartment 480 (or the forward end 482 being to the left of the mobile cargo controller 400), and the cargo zone indicator 420*c* being closest to the left side 488 of the cargo compartment 480 (or the left side 488 being behind the mobile cargo controller 400)).

Figure 6E:
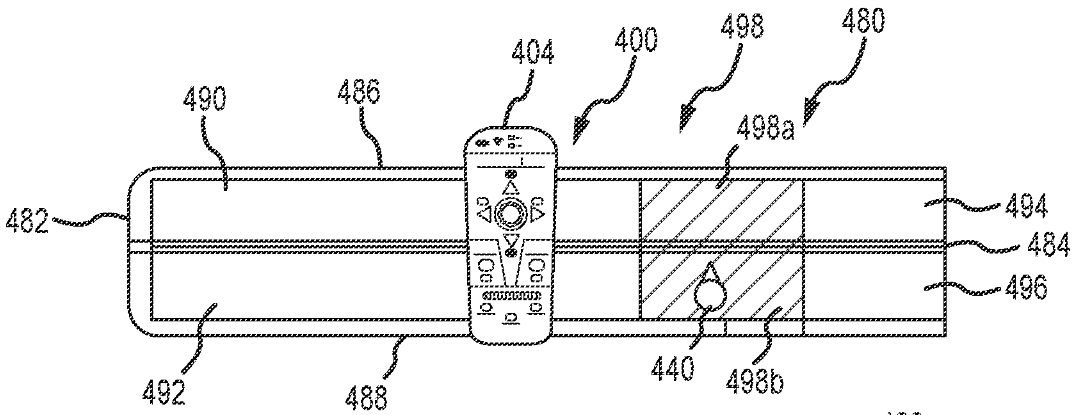
FIG. 6E illustrates active cargo zone indicators for an activated doorway zone and one orientation of the mobile cargo controller of FIG. 4A, in accordance with various embodiments.

In FIG. 6E the mobile cargo controller 400 continues to have its forward end 404 pointing toward the right side 486 of the cargo compartment 480. In order to activate just the doorway zone 498, the cargo zone selectors 418*a* and 418*c* have each been actuated-cargo zone selectors 418*b* and 418*d* not having been actuated or having been de-selected (the cargo zone indicator 420*a* being closest to the right side 486 of the cargo compartment 480 (or the right side 486 being in front of the mobile cargo controller 400), the cargo zone indicator 420*c* being closest to the left side 488 of the cargo compartment 480 (or the left side 488 being behind the mobile cargo controller 400), the cargo zone indicator 420*d* (inactive) being closest to the forward end 482 of the cargo compartment 480 (or the forward end 482 being to the left of the mobile cargo controller 400), and the cargo zone indicator 420*b* (inactive) being closest to the aft end 484 of the cargo compartment 480 (or the aft end 484 being to the right of the mobile cargo controller 400)).

Figure 6F:
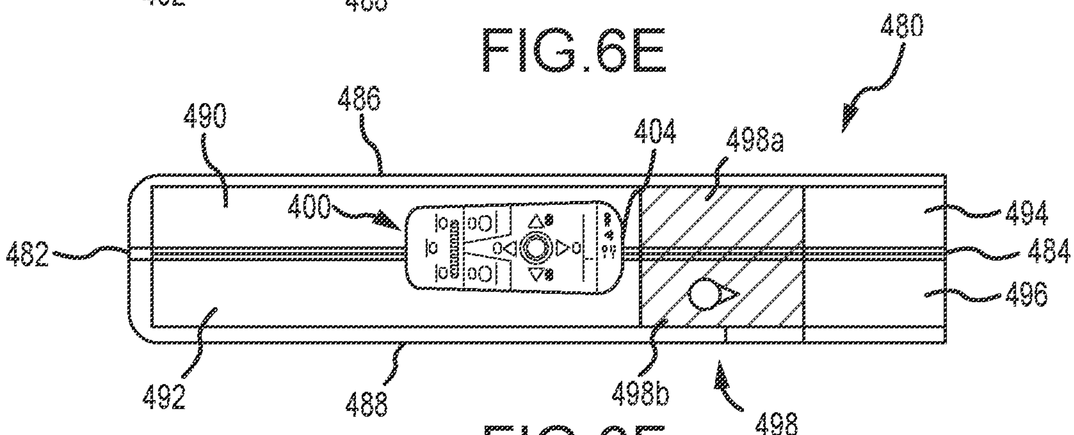
FIG. 6F illustrates active cargo zone indicators for an activated doorway zone and for another orientation of the mobile cargo controller of FIG. 4A (compared to FIG. 6E), in accordance with various embodiments.

In FIG. 6F the doorway zone 498 is still the active cargo zone, but the orientation of the mobile cargo controller 400 has been changed from that shown in FIG. 6E. The forward end 404 of the mobile cargo controller 400 now points toward the aft end 484 of the cargo compartment 480. Note that this change in orientation of the mobile cargo controller 400 still identifies to the operator that the doorway zone 498 is still the active cargo zone by simply viewing the mobile cargo controller 400, namely by the cargo zone indicators 420*b* and 420*d* now being activated and the cargo zone indicators 420*a*, 420*c* not being activated (the cargo zone indicator 420*a* being closest to the aft end 484 of the cargo compartment 480 (or the aft end 484 being in front of the mobile cargo controller 400), the cargo zone indicator 420*b* being closest to the left side 488 of the cargo compartment 480 (or the left side 488 being to the right of the mobile cargo controller 400), the cargo zone indicator 420*c* being closest to the forward end 482 of the cargo compartment 480 (or the forward end 482 being behind the mobile cargo controller 400), and the cargo zone indicator 420*d* being closest to the right side 486 of the cargo compartment 480 (or the right side 486 being to the left of the mobile cargo controller 400)).

Figure 6G:
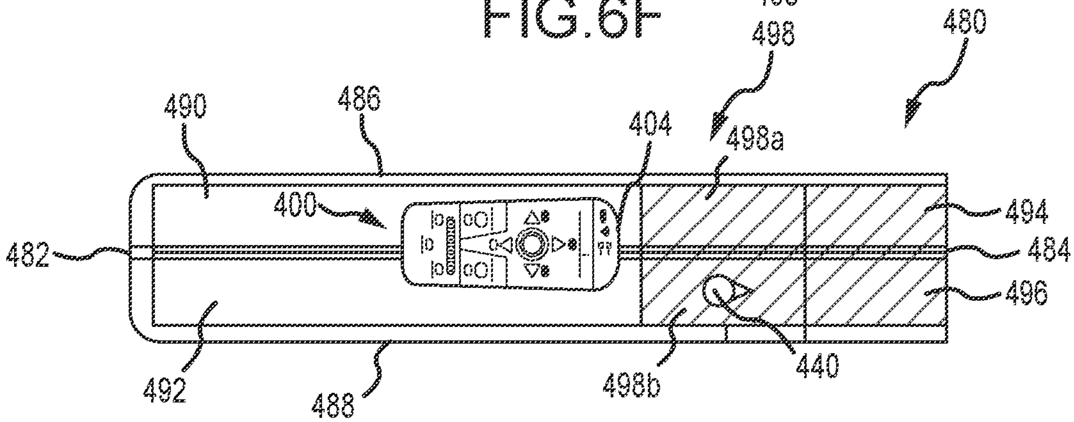
FIG. 6G illustrates active cargo zone indicators for an activated aft-right cargo zone and an activated aft-left cargo zone for one orientation of the mobile cargo controller of FIG. 4A, in accordance with various embodiments.

In FIG. 6G the mobile cargo controller 400 continues to have its forward end 404 pointing toward the aft end 484 of the cargo compartment 480. In order to select or activate the aft-right cargo zone 494 and the aft-left cargo zone 496, the cargo zone selectors 418*a*, 418*b*, and 418*d* have each been actuated and that activates the corresponding cargo zone indicators 420*a*, 420*b*, and 420*d*. Selection of the aft-right cargo zone 494 and aft-left cargo zone 496 in this manner could also automatically select the doorway zone 498 (the cargo zone indicator 420*a* being closest to the aft end 484 of the cargo compartment 480 (or the aft end 484 being in front of the mobile cargo controller 400), the cargo zone indicator 420*b* being closest to the left side 488 of the cargo compartment 480 (or the left side 488 being to the right of the mobile cargo controller 400), and the cargo zone indicator 420*d* being closest to the right side 486 of the cargo compartment 480 (or the right side 486 being to the left of the mobile cargo controller 400)).

Figure 7A:
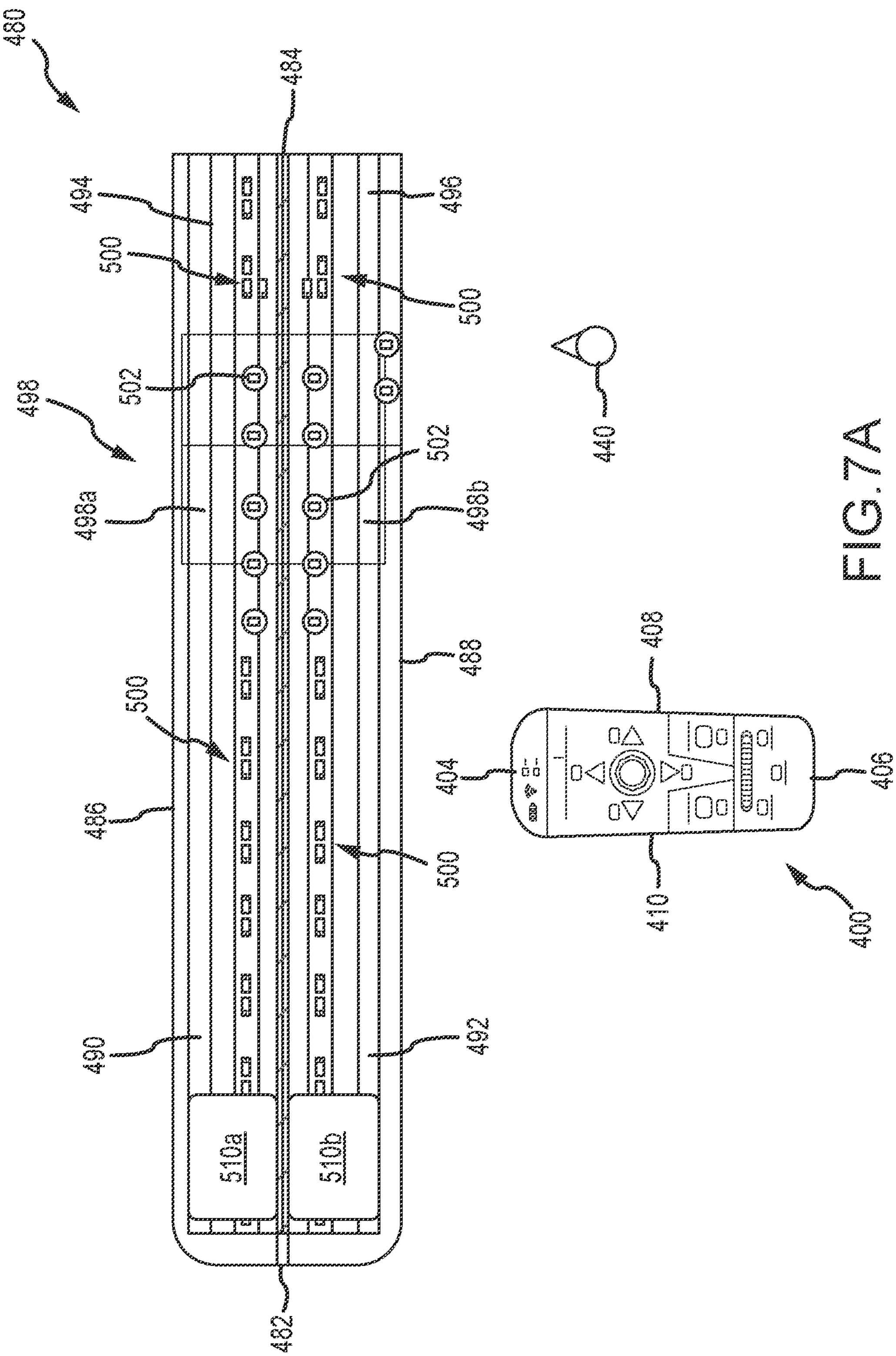
FIG. 7A illustrates the mobile cargo controller of FIG. 4A in one orientation within a cargo compartment having a pair of unit load devices (ULDs) therewithin, in accordance with various embodiments.
Figure 7B:
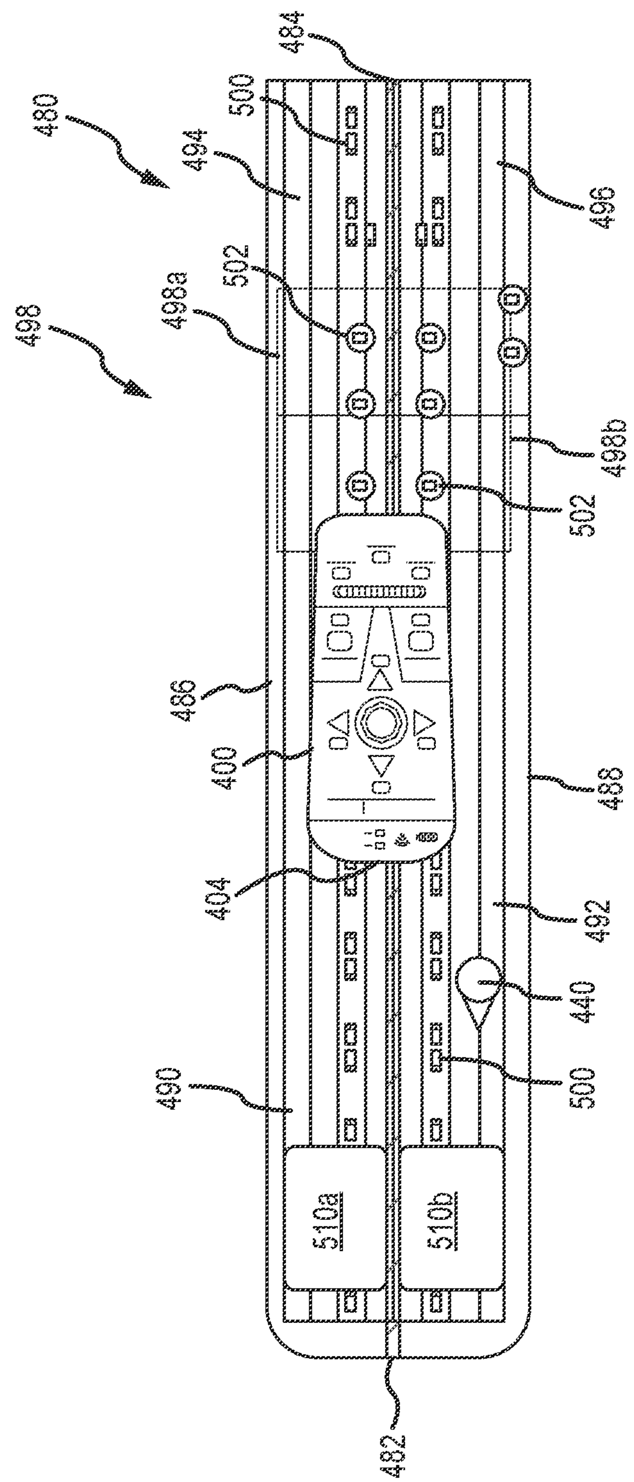
FIG. 7B illustrates the mobile cargo controller of FIG. 4A in a different orientation within a cargo compartment (compared to FIG. 7A) with the pair of unit load devices (ULDs) therewithin, in accordance with various embodiments.
Figures 7C, 7D:
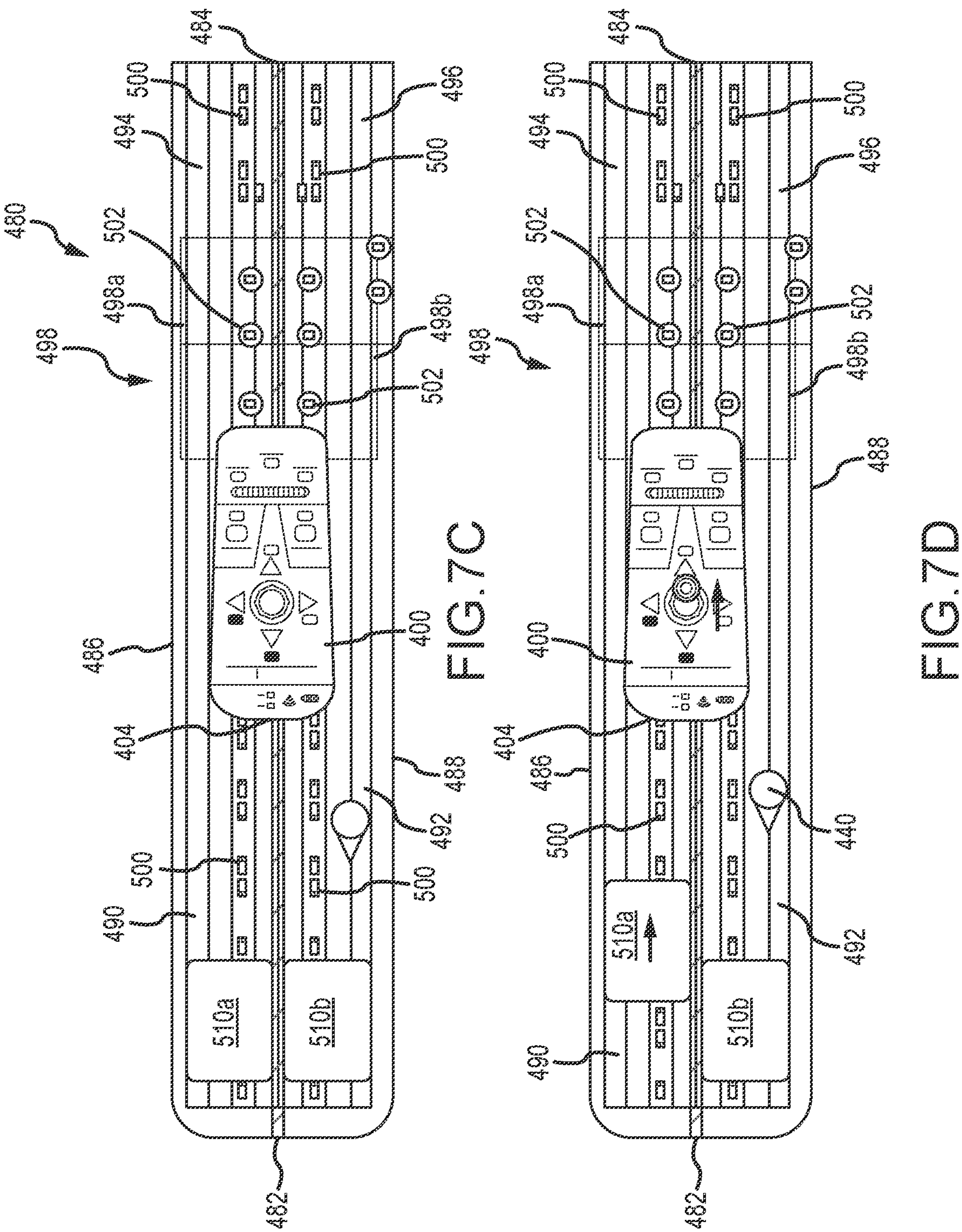
FIG. 7C illustrates activated cargo zone indicators for an activated forward-right cargo zone and one orientation of the mobile cargo controller of FIG. 4A, in accordance with various embodiments.
FIG. 7D illustrates operation of a cargo motion controller to move one of the ULDs in the direction of the arrow, in accordance with various embodiments.

FIGS. 7A-7G present a number of views regarding use/operation of the mobile cargo controller 400 in relation to the cargo compartment 480, including with regard to moving cargo with the cargo compartment 480. FIG. 7A is in accord with the discussion of FIG. 5 above, but adds a pair of ULDs 510*a*, 510*b* in the forward-right cargo zone 490 and the forward-left cargo zone 492, respectively. In FIG. 7B, the mobile cargo controller 400 has its forward end 404 pointing toward forward end 482 of the cargo compartment 480. In order to select or activate the forward-right cargo zone 490 and as illustrated in FIG. 7C, the cargo zone selectors 418*a* and 418*b* are each actuated and that activates the corresponding cargo zone indicators 420*a*, 420*b* (the cargo zone indicator 420*a* being closest to the forward end 482 of the cargo compartment 480 (or the forward end 482 being in front of the mobile cargo controller 400), and the cargo zone indicator 420*b* being closest to the right side 486 of the cargo compartment 480 (or the right side 486 being to the right of the mobile cargo controller 400)). Selection of the forward-right cargo zone 490 in the above-noted manner could also automatically select at least the right doorway zone 498*a* (or the entire doorway zone 498).

Figure 7E:
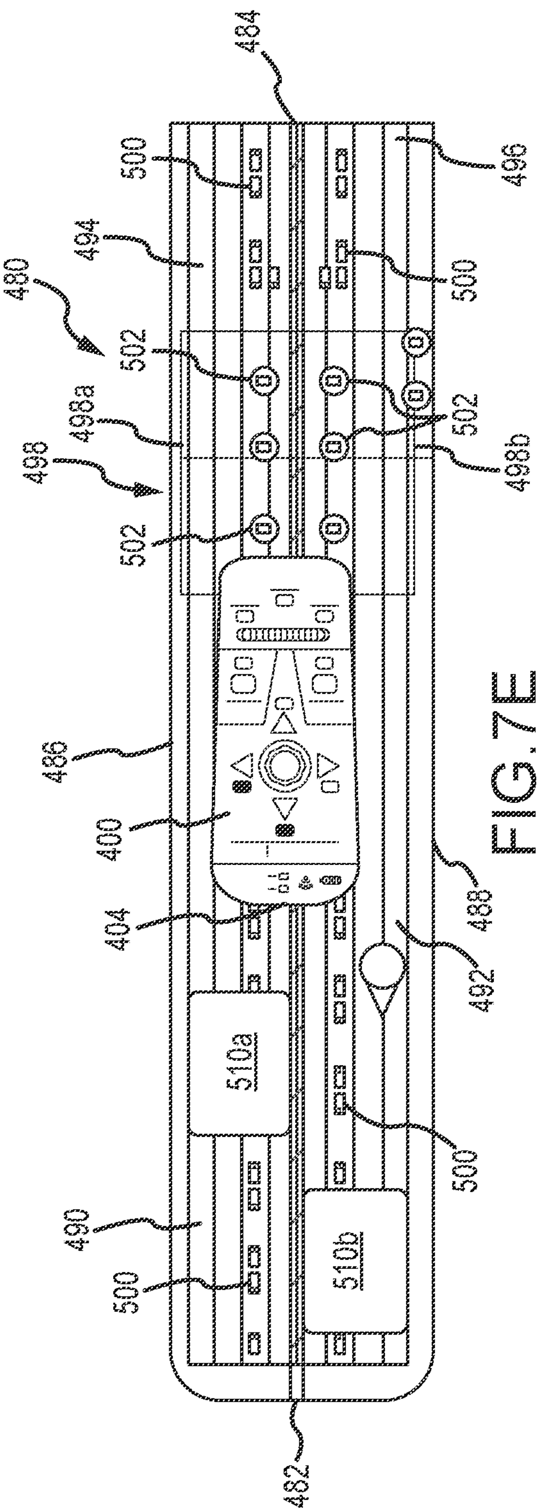
FIG. 7E illustrates the ULD in a new position within the forward-right cargo zone based upon the operation shown in FIG. 7D, in accordance with various embodiments.

FIG. 7D illustrates moving the cargo motion controller 422 of the mobile cargo controller 400 (see corresponding arrow) in the direction of the aft end 406 of the mobile cargo controller 400 (and also in the direction of the aft end 484 of the cargo compartment 480, and also possibly toward the operator), which via corresponding PDUs 500 advances the ULD 510*a* along an at least generally axial path within the forward-right cargo zone 490 and toward the aft end 484 of the cargo compartment 480 (see corresponding arrow). FIG. 7E illustrates the cargo motion controller 422 having been released to terminate aftward axial movement of the ULD 510*a* in accordance with the foregoing.

Figure 7F:
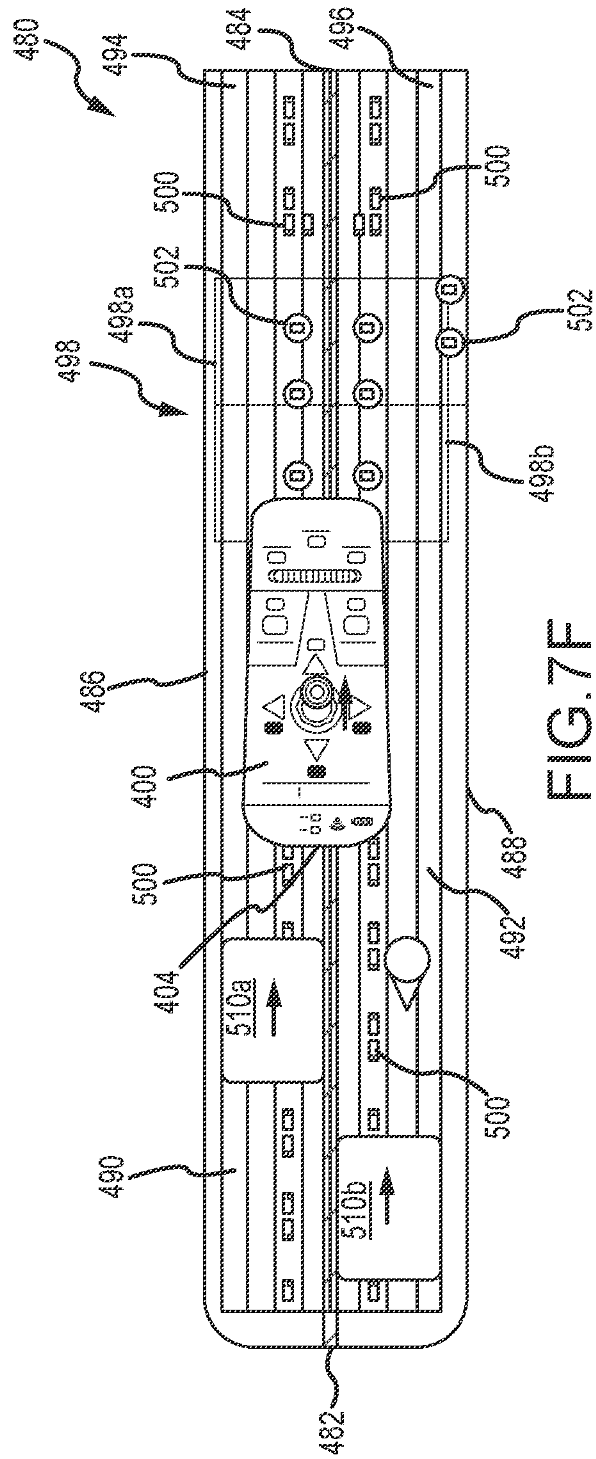
FIG. 7F illustrates active cargo zone indicators for an activated forward-right cargo zone, for an activated forward-left cargo zone, for one orientation of the mobile cargo controller of FIG. 4A, and operation of a cargo motion controller to simultaneously move both ULDs in the direction of the corresponding arrow, in accordance with various embodiments.
Figure 7G:
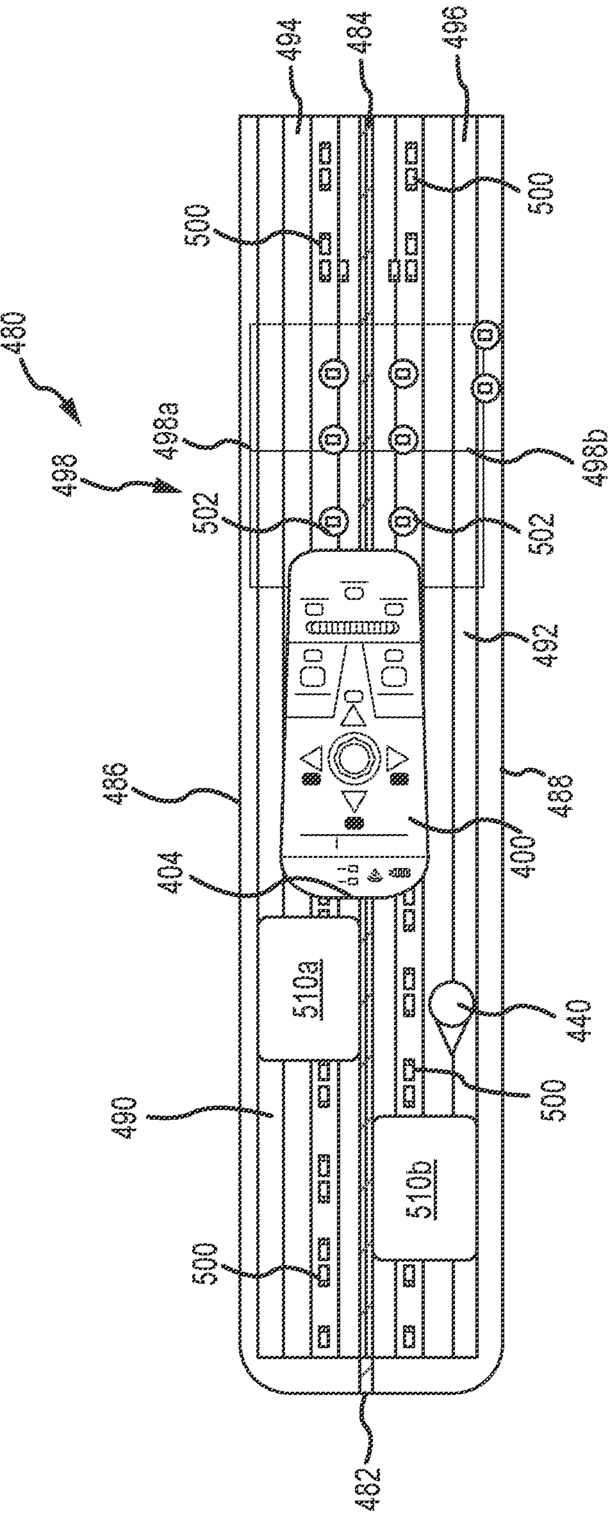
FIG. 7G illustrates the ULDs in a new position within the forward-right and forward-left cargo zones based upon the operation shown in FIG. 7F, in accordance with various embodiments.

In order to select or activate both the forward-right cargo zone 490 and the forward-left cargo zone 492 and as illustrated in FIG. 7F, the cargo zone selectors 418*a*, 418*b*, and 418*d* are each actuated and that activates the corresponding cargo zone indicators 420*a*, 420*b*, 420*d* (the cargo zone indicator 420*a* being closest to the forward end 482 of the cargo compartment 480 (or the forward end 482 being in front of the mobile cargo controller 400), the cargo zone indicator 420*b* being closest to the right side 486 of the cargo compartment 480 (or the right side 486 being to the right of the mobile cargo controller 400), and the cargo zone indicator 420*d* being closest to the left side 488 of the cargo compartment 480 (or the left side 488 being to the left of the mobile cargo controller 400)). Selection of the forward-right cargo zone 490 and the forward-left cargo zone 492 in the above-noted manner could also automatically select both the right doorway zone 498a and the left doorway zone 498b. In any case, the cargo motion controller 422 of the mobile cargo controller 400 now may be moved (see corresponding arrow) in the direction of the aft end 406 of the mobile cargo controller 400 (and also in the direction of the aft end 484 of the cargo compartment 480, and also possibly toward the operator), which via corresponding PDUs 500 advances both the ULD 510a and the ULD 510b along an at least generally axial path within the forward-right cargo zone 490 and the forward-left cargo zone 492, respectively, and toward the aft end 484 of the cargo compartment 480 (see corresponding arrows). FIG. 7G illustrates the cargo motion controller 422 having been released to terminate aftward axial movement of the ULD 510a and ULD 510b in accordance with the foregoing.

Figure 8A:
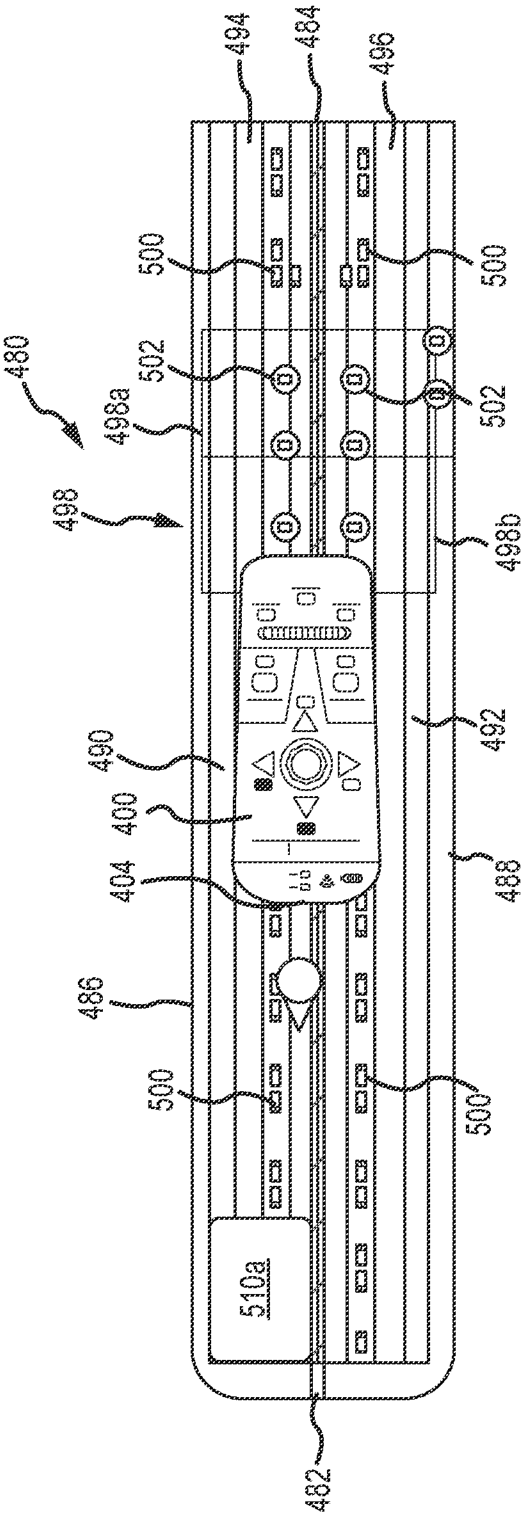
FIG. 8A illustrates active cargo zone indicators for an activated forward-right cargo zone, for one orientation of the mobile cargo controller of FIG. 4A, and with a ULD being in the forward-right cargo zone, in accordance with various embodiments.

FIGS. 8A-8E also present a number of views regarding use/operation of the mobile cargo controller 400 in relation to the cargo compartment 480, including with regard to moving cargo with the cargo compartment 480. In FIG. 8A the mobile cargo controller 400 has its forward end 404 pointing toward the forward end 482 of the cargo compartment 480. In order to select or activate the forward-right cargo zone 490 and as illustrated in FIG. 8A, the cargo zone selectors 418a and 418b are each actuated and that activates the corresponding cargo zone indicators 420a, 420b (the cargo zone indicator 420a being closest to the forward end 482 of the cargo compartment 480 (or the forward end 482 being in front of the mobile cargo controller 400), and the cargo zone indicator 420b being closest to the right side 486 of the cargo compartment 480 (or the right side 486 being to the right of the mobile cargo controller 400)). Selection of the forward-right cargo zone 490 in the above-noted manner could also automatically select at least the right doorway zone 498a (or the entire doorway zone 498).

Figure 8B:
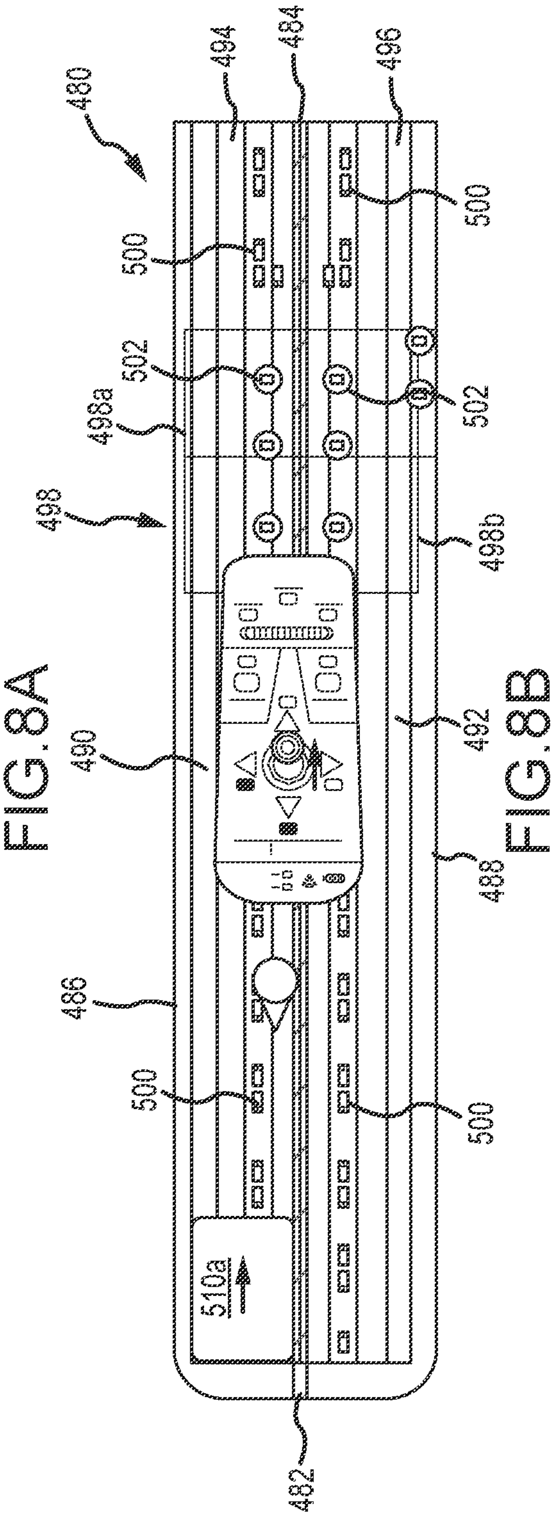
FIG. 8B illustrates operation of a cargo motion controller to move the ULD of FIG. 8A in the direction of the arrow and with the mobile cargo controller remaining in the orientation shown in FIG. 8A, in accordance with various embodiments.
Figure 8C:
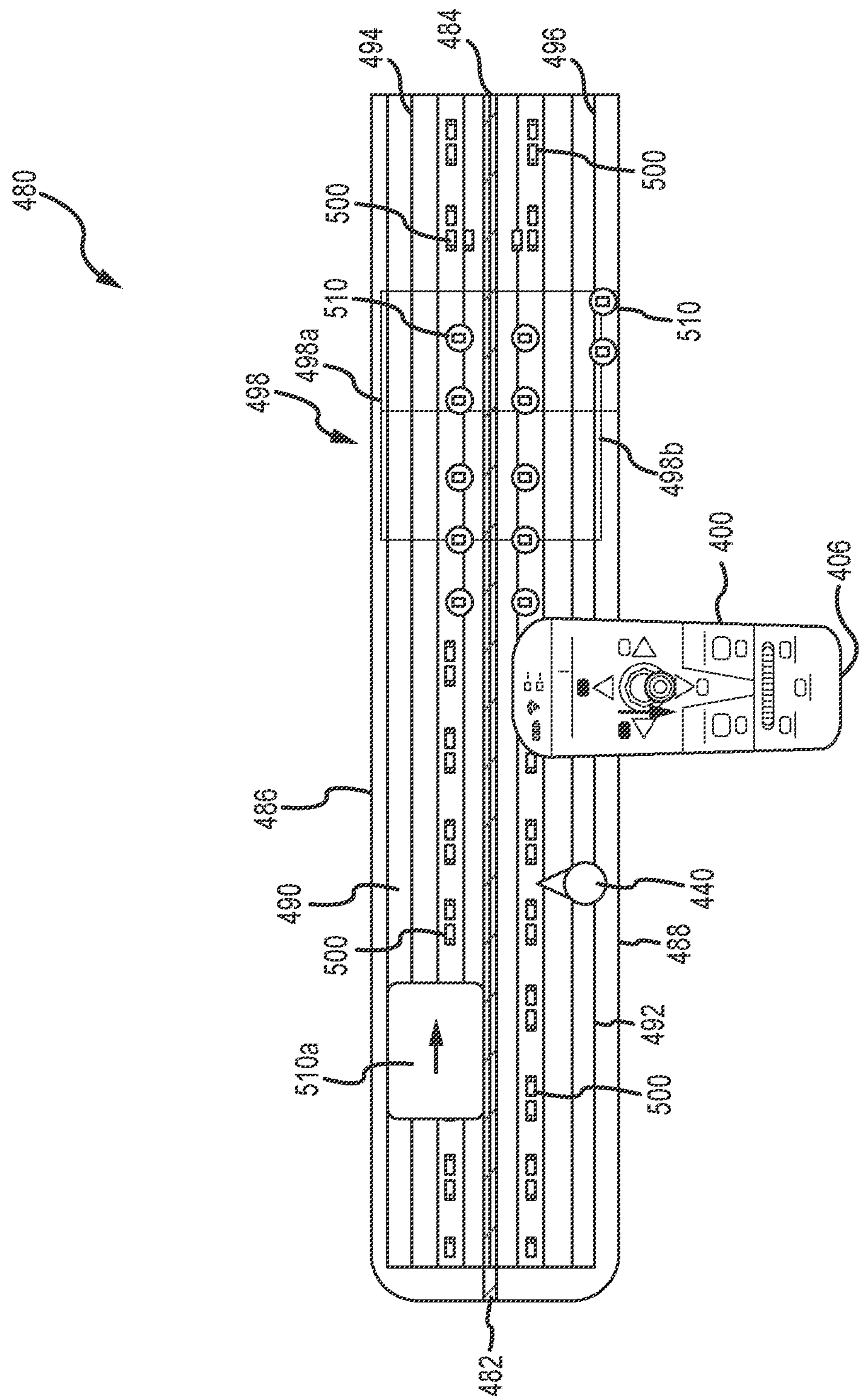
FIG. 8C illustrates continued operation of a cargo motion controller in accordance with FIG. 8B while simultaneously changing the orientation of the mobile cargo controller, in accordance with various embodiments.

FIG. 8B illustrates moving the cargo motion controller 422 (see corresponding arrow) of the mobile cargo controller 400 in the direction of the aft end 406 of the mobile cargo controller 400 (and also in the direction of the aft end 484 of the cargo compartment 480, and also possibly toward the operator), which via corresponding PDUs 500 advances the ULD 510a along an at least generally axial path within the forward-right cargo zone 490 and toward the aft end 484 of the cargo compartment 480 (see corresponding arrow). Without releasing the cargo motion controller 422 of the mobile cargo controller 400, the orientation of the mobile cargo controller 400 can be changed and yet continue to advance the ULD 510a along an at least generally axial path within the forward-right cargo zone 490 and toward the aft end 484 of the cargo compartment 480. An example of this is shown in FIG. 8C, although note that changing the orientation of the mobile cargo controller 400 did update the location of the activated/selected forward-right cargo zone 490 on the mobile cargo controller 400 (the cargo zone indicator 420d (activated) now being closest to the forward end 482 of the cargo compartment 480 (or the forward end 482 being to the left of the mobile cargo controller 400), and the cargo zone indicator 420a (activated) now being closest to the right side 486 of the cargo compartment 480 (or the right side 486 being in front of the mobile cargo controller 400)), the cargo motion controller 422 continues to be operated in the manner addressed in FIG. 8B and still yields the motion of the cargo 510a addressed in FIG. 8B.

Figure 8D:
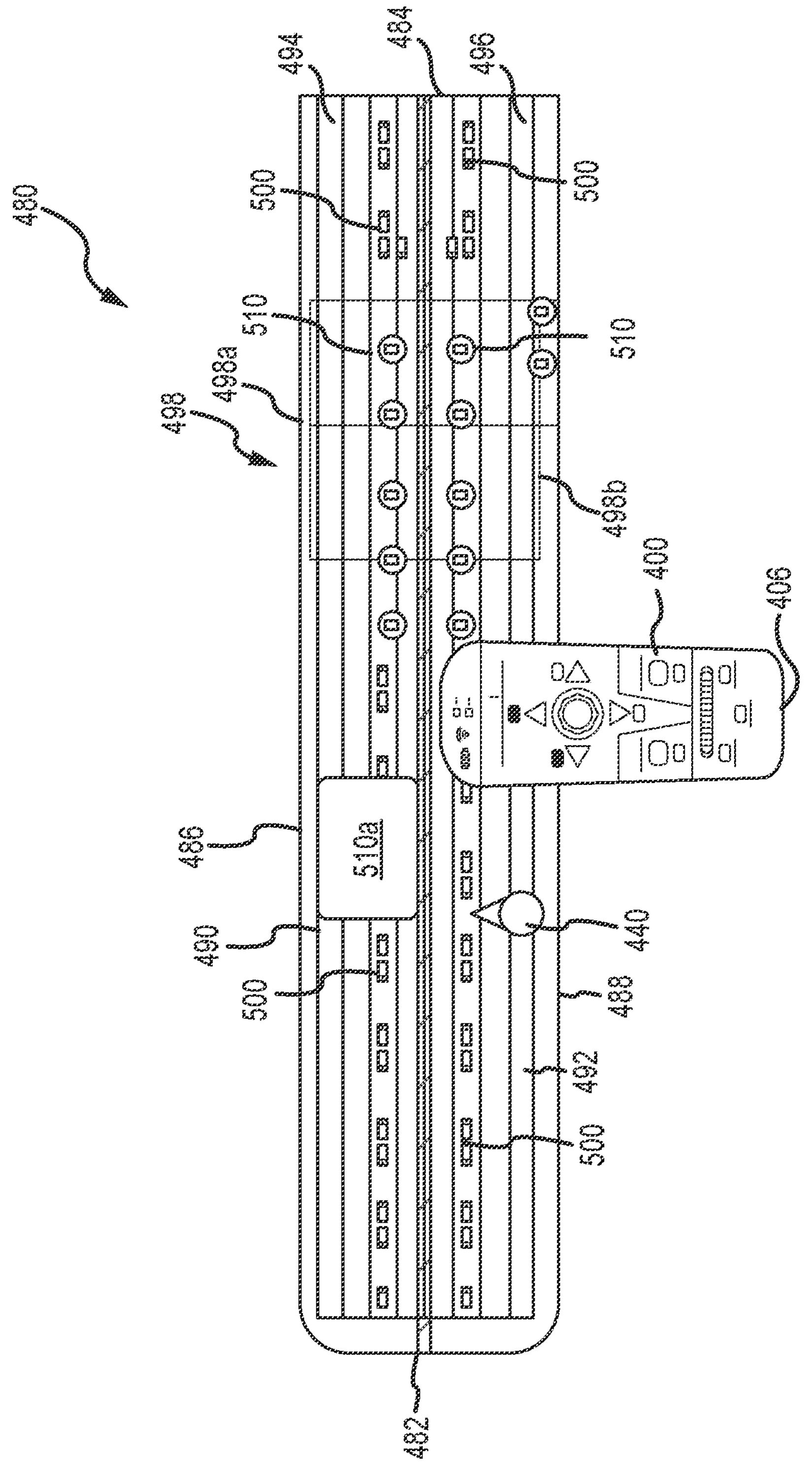
FIG. 8D illustrates a position of the ULD after termination of operation pursuant to FIG. 8C, in accordance with various embodiments.
Figure 8E:
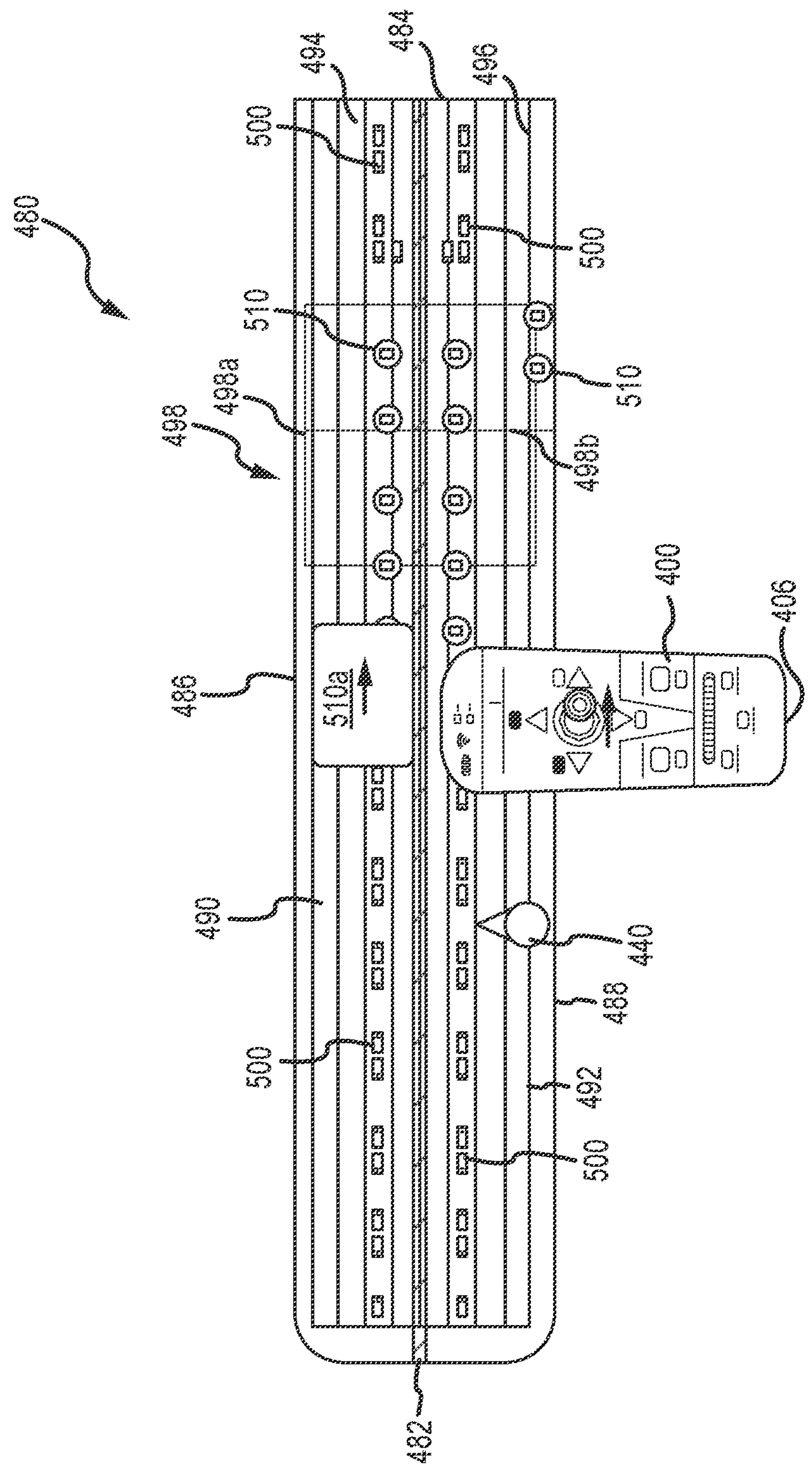
FIG. 8E illustrates operation of a cargo motion controller to move the ULD of FIG. 8D in the direction of the arrow and with the mobile cargo controller remaining in the orientation shown in FIG. 8D, in accordance with various embodiments.

FIG. 8D illustrates the cargo motion controller 422 having been released to terminate aftward movement of the ULD 510a within the selected/activated forward-right cargo zone 490. Thereafter, if further aftward advancement of the ULD 510a in accordance with the foregoing is desired, and as illustrated in FIG. 8E, the cargo motion controller 422 is now moved in the direction of the right side 408 of the mobile cargo controller 400 or toward the aft end 484 of the cargo compartment 480 (see corresponding arrow) to move the cargo 510 in accordance with the corresponding arrow.

Figure 9A:
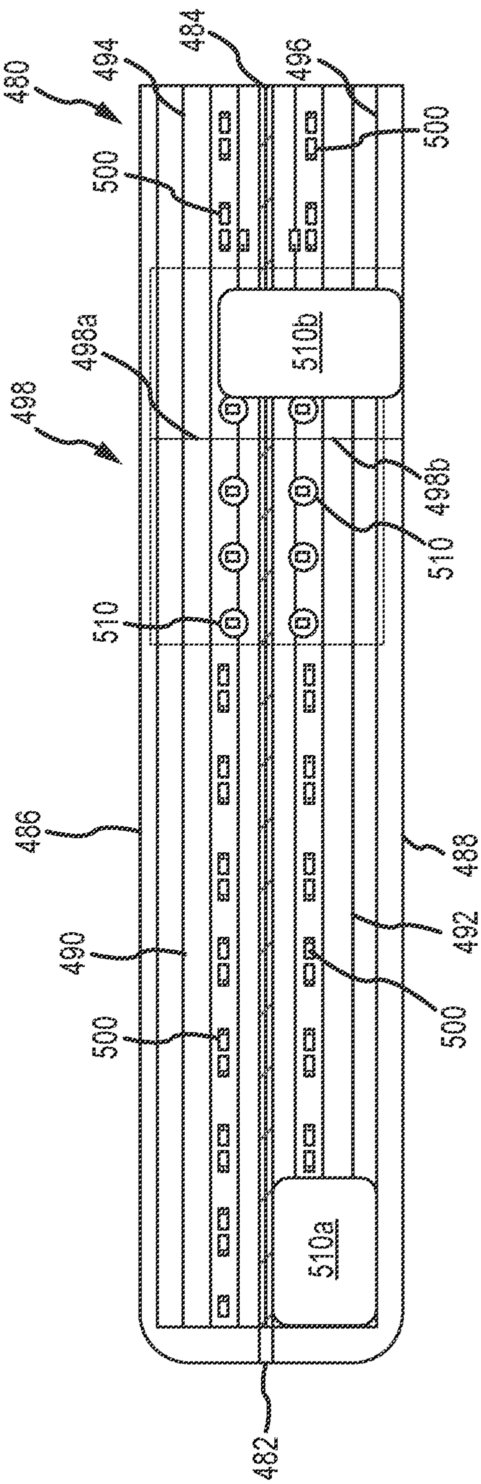
FIG. 9A illustrates a ULD in a doorway zone, in accordance with various embodiments.
Figure 9B:
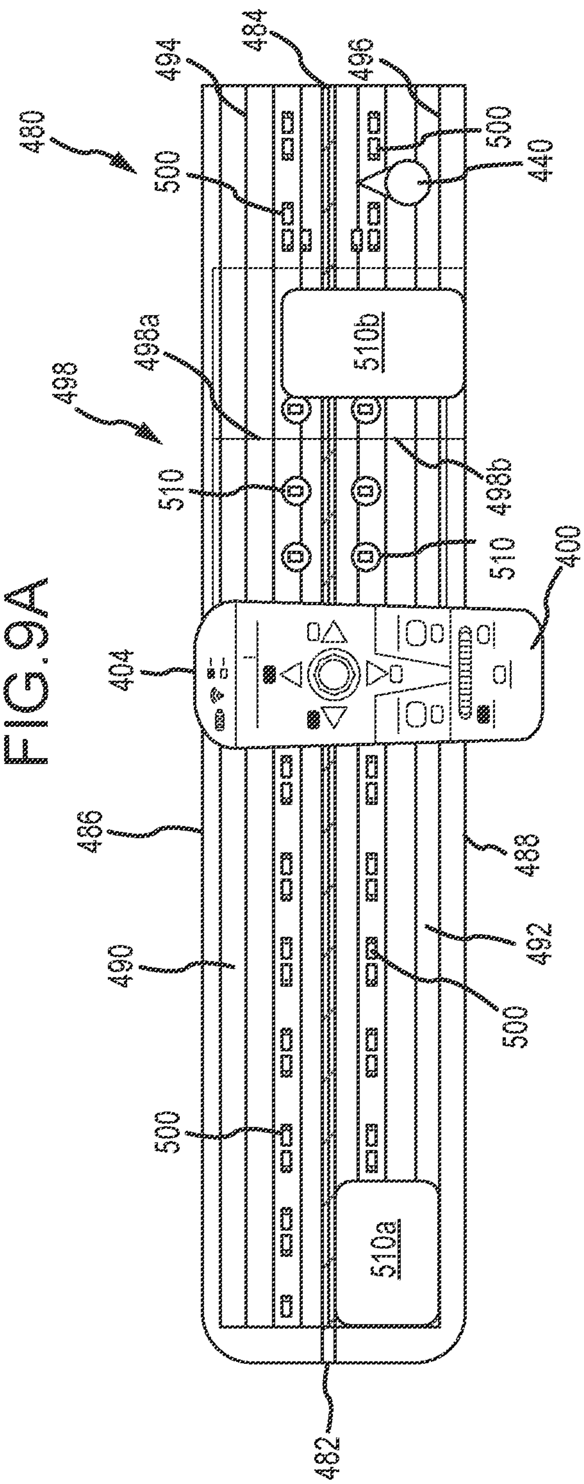
FIG. 9B illustrates the mobile cargo controller in one orientation within a cargo compartment, in accordance with various embodiments.

FIGS. 9A-9E illustrate a representative sequence for "single operator rotation"-more specifically for a single operator to rotate a ULD into the cargo compartment 480. Rotation of a ULD within the doorway zone 498 (as addressed in FIGS. 9A-13B) again uses the FCTs 502. FIG. 9A shows a ULD 510a in the forward-left cargo zone 492 and another ULD 510b in the doorway zone 498 for rotation into the compartment 480. FIG. 9B shows an orientation of the mobile cargo controller 400 where the forward-right cargo zone 490 has been selected or activated (evidenced by the activation of the cargo zone indicators 420a and 420d).

Figure 9C:
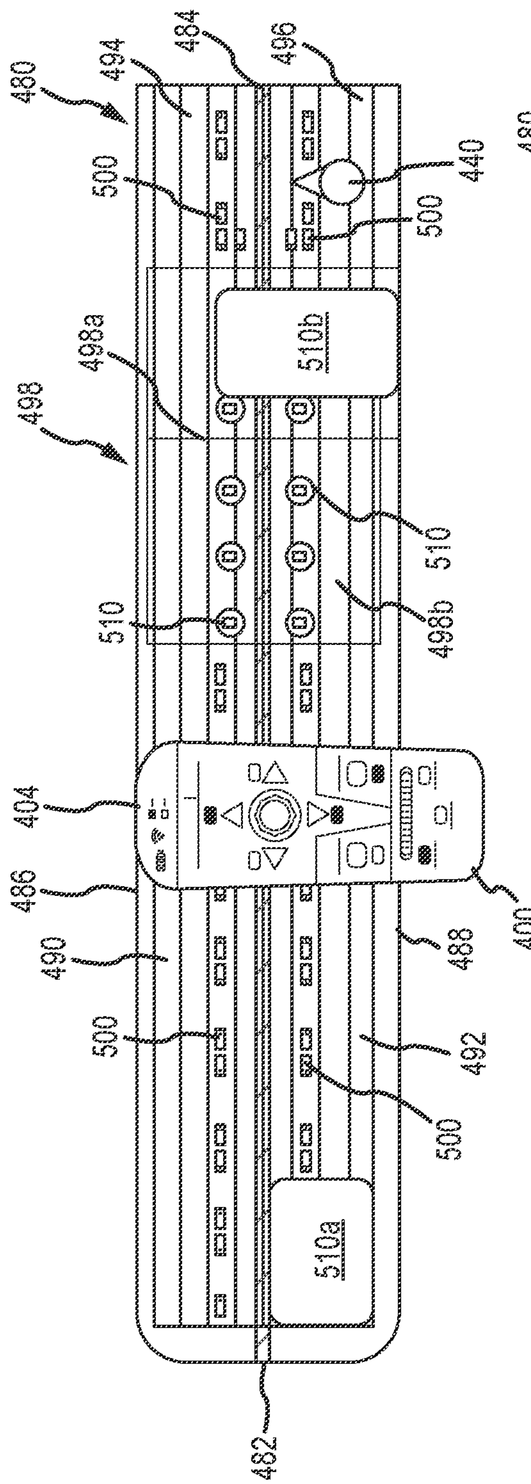
FIG. 9C illustrates active cargo zone indicators for the doorway zone, an active cargo rotation indicator, and for rotation of a ULD into the cargo compartment with the mobile cargo controller of FIG. 4A being in one orientation, in accordance with various embodiments.

In order to rotate the ULD 510b of FIGS. 9A-9B into the cargo compartment 480 and as illustrated in FIG. 9C: 1) the operator actuates the cargo rotation selector 428 and that activates the cargo rotation indicator 430; and 2) the operator operates the operation selector 432 to select a "loading" operation and that activates the loading operation indicator 434. This may be done in any order. Actuation of the cargo rotation selector 428 updates the relevant cargo zone indicators 420a-420d to show the doorway zone 498 as being the active cargo zone. Compare FIG. 9B with FIG. 9C, where in FIG. 9C the cargo zone indicators 420a, 420c have been activated and with the cargo zone indicators 420b, 420d being inactive for purposes of conveying that the doorway zone 498 is the active cargo zone (the cargo zone indicator 420a being closest to the right side 486 of the cargo compartment 480 (or the right side 486 being in front of the mobile cargo controller 400), the cargo zone indicator 420c being closest to the left side 488 of the cargo compartment 480 (or the left side 488 being behind the mobile cargo controller 400), the cargo zone indicator 420d (inactive) being closest to the forward end 482 of the cargo compartment 480 (or the forward end 482 being to the left of the mobile cargo controller 400), and the cargo zone indicator 420b (inactive) being closest to the aft end 484 of the cargo compartment 480 (or the aft end 484 being to the right of the mobile cargo controller 400)).

Figure 9D:
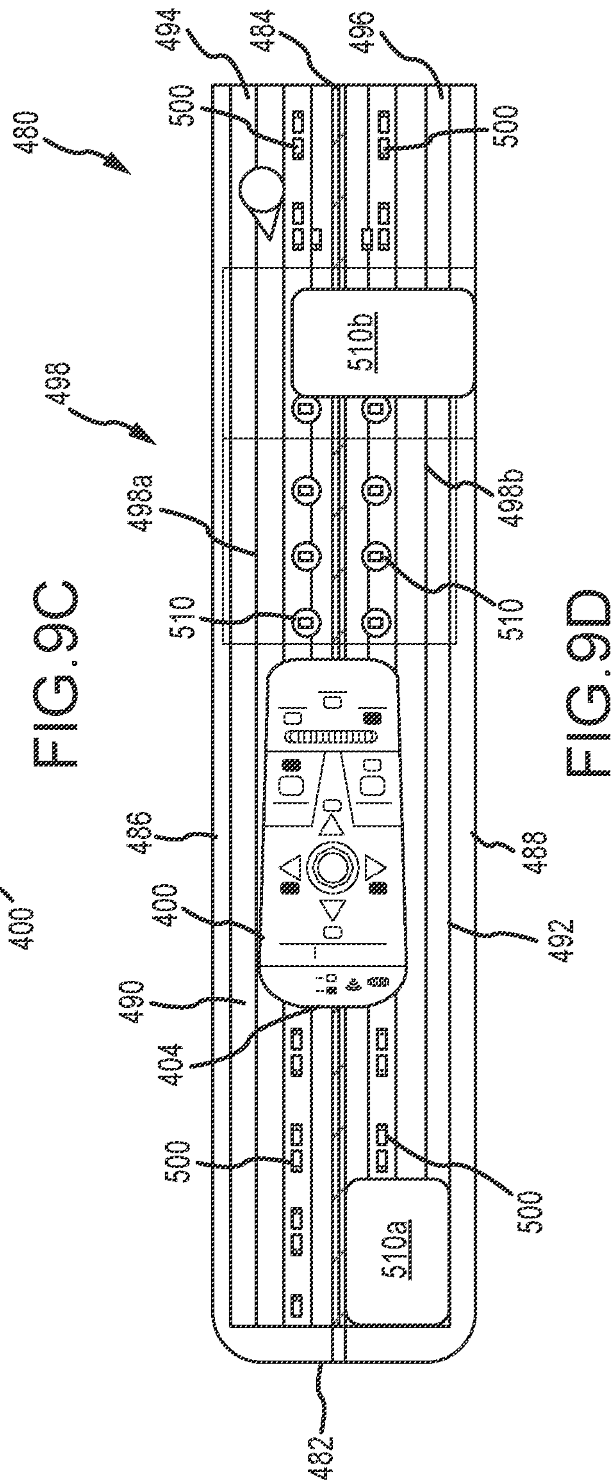
FIG. 9D illustrates active cargo zone indicators for the doorway zone, an active cargo rotation indicator, and for rotation of a ULD into the cargo compartment with the mobile cargo controller of FIG. 4A being in a different orientation from FIG. 9C, in accordance with various embodiments.
Figure 9E:
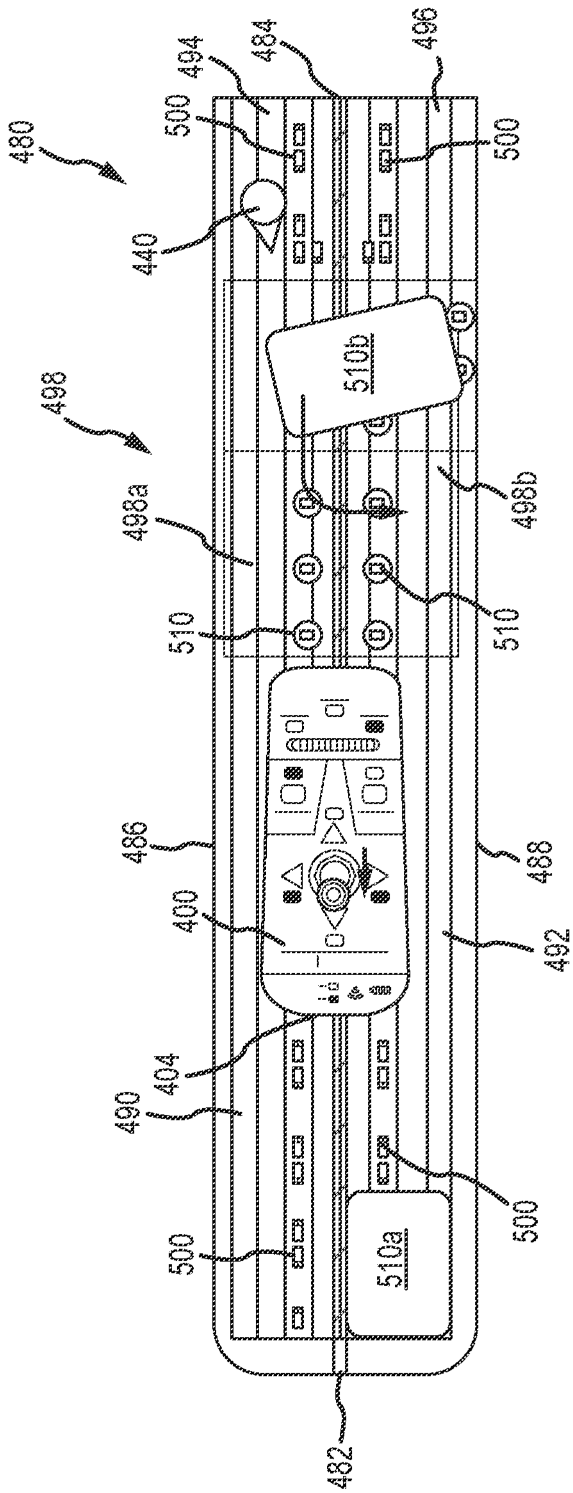
FIG. 9E illustrates on operation of a cargo motion controller to rotate the ULD FIG. 9D in the direction of the arrow and with the mobile cargo controller remaining in the orientation shown in FIG. 9D, in accordance with various embodiments.

FIG. 9D illustrates a different orientation for the mobile cargo controller 400 compared to FIG. 9C, but where the mobile cargo controller 400 remains configured to rotate the ULD 510b into the cargo compartment 480 at least generally in accordance with the foregoing. The forward end 404 of the mobile cargo controller 400 now points toward the forward end 482 of the cargo compartment 480 (the cargo zone indicator 420a (inactive) being closest to the forward end 482 of the cargo compartment 480 (or the forward end 482 being in front of the mobile cargo controller 400), the cargo zone indicator 420b (active) being closest to the right side 486 of the cargo compartment 480 (or the right side 486 being to the right of the mobile cargo controller 400), the cargo zone indicator 420c (inactive) being closest to the aft end 484 of the cargo compartment 480 (or the aft end 484 being behind the mobile cargo controller 400), and the cargo zone indicator 420d (active) being closest to the left side 488 of the cargo compartment 480 (or the left side 488 being to the left of the mobile cargo controller 400)). FIG. 9E illustrates the mobile cargo controller 400 remaining in the FIG. 9D orientation, and furthermore moving the cargo motion controller 422 in the direction of the forward end 404 of the mobile cargo controller 400 or the forward end 482 of the cargo compartment 480 (see corresponding arrow) to rotate the ULD 510*b* in a counterclockwise direction (see corresponding arrow). When the ULD 510*b* has been rotated 90° in this manner and from the position shown in FIG. 9D (or to the position of the ULD 510*b* shown in FIG. 11B), the ULD 510*b* can be moved into the forward-left cargo zone 492.

Figure 10A:
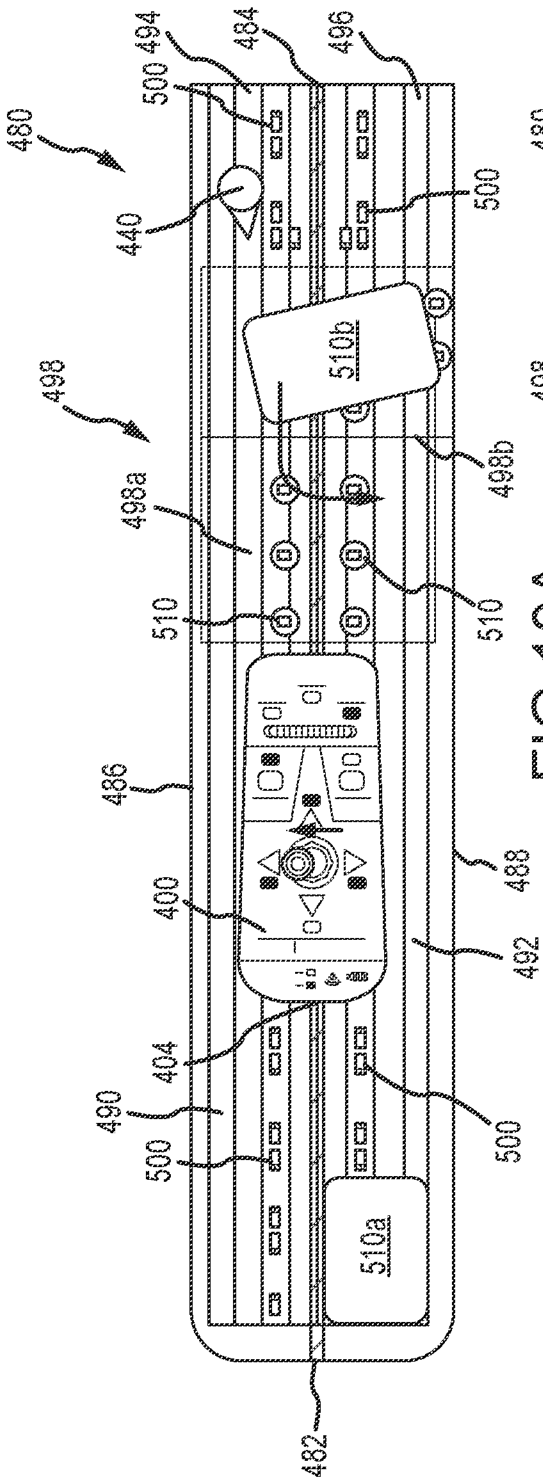
FIGS. 10A and 10B each illustrate active cargo zone indicators for a doorway zone, an active cargo rotation indicator, a different operation of a cargo motion controller (compared to FIG. 9E) to rotate a ULD into the cargo compartment, and with the mobile cargo controller of FIG. 4A remaining in the FIG. 9E orientation, in accordance with various embodiments.
Figure 10B:
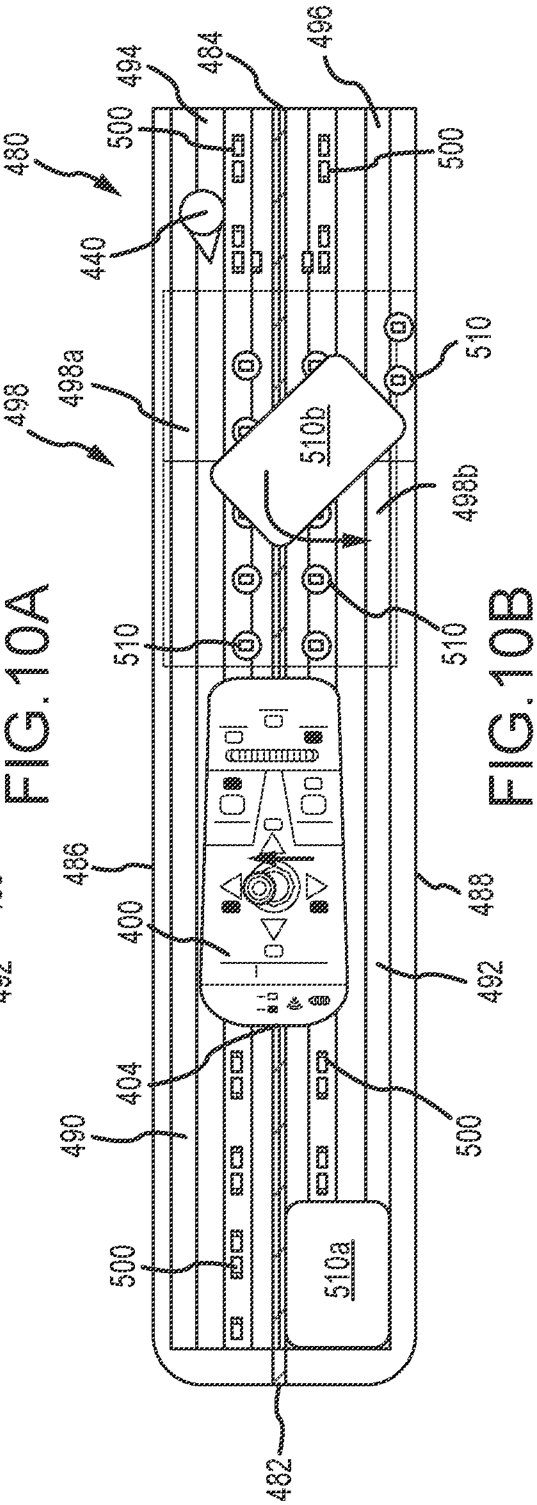

FIGS. 10A-10B illustrate another representative sequence for "single operator rotation"—more specifically for a single operator to rotate a ULD into the cargo compartment 480. FIG. 10A shows a ULD 510*a* in the forward-left cargo zone 492 and another ULD 510*b* in the doorway zone 498, with the mobile cargo controller 400 having been configured in accordance with the discussion of FIG. 9A-9E above for such an operation, and with the mobile cargo controller 400 being in the same orientation as FIG. 9D as discussed above. FIGS. 10A-10B each illustrate moving the cargo motion controller 422 in the direction of the right side 408 of the mobile cargo controller 400 or the right side 486 of the cargo compartment 480 (see corresponding arrow) to rotate the ULD 510*b* in a counterclockwise direction (see corresponding arrow). Note that the orientation of the cargo motion control 422 is the same in FIGS. 10A-10B as in FIG. 9E discussed above and that the operation of the cargo motion controller 422 in FIGS. 10A-10B is different from that shown in FIG. 9E discussed above but yet accomplishes the same motion for the ULD 510*b* (i.e., more than one option may exist for operating the cargo motion controller 422 in the same orientation to affect a certain motion of a ULD).

Figure 10C:
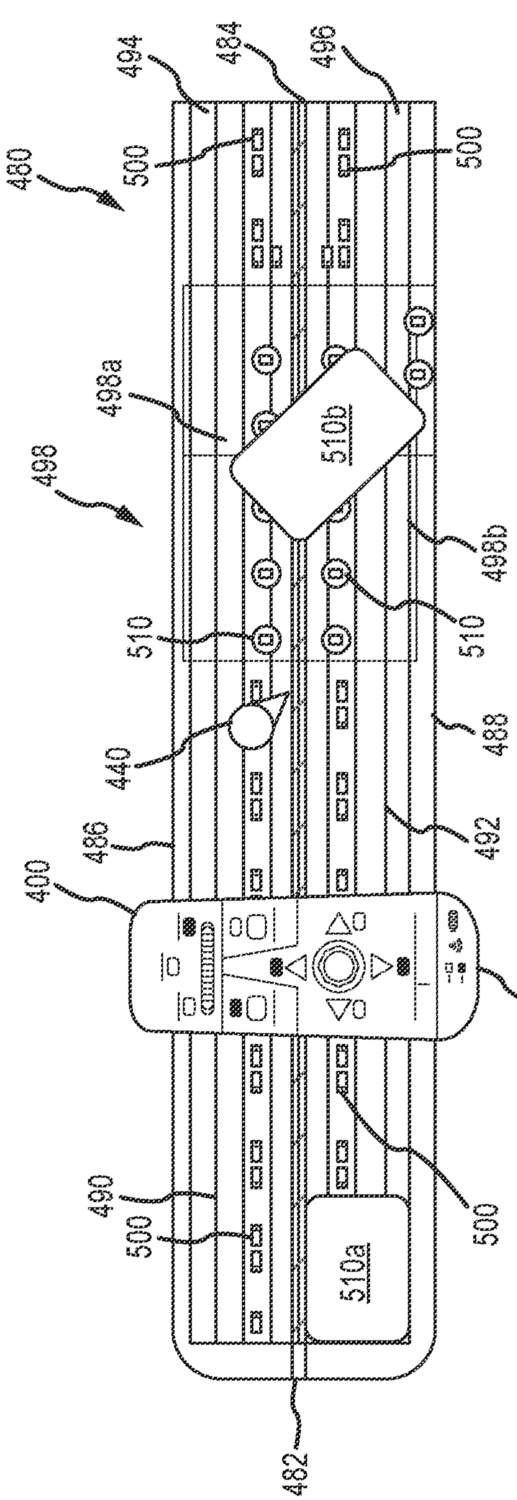
FIG. 10C illustrates the ULD in the position of FIG. 10B, but with the mobile cargo controller of FIG. 4A now being in a different orientation compared to FIG. 10B, in accordance with various embodiments.
Figure 10D:
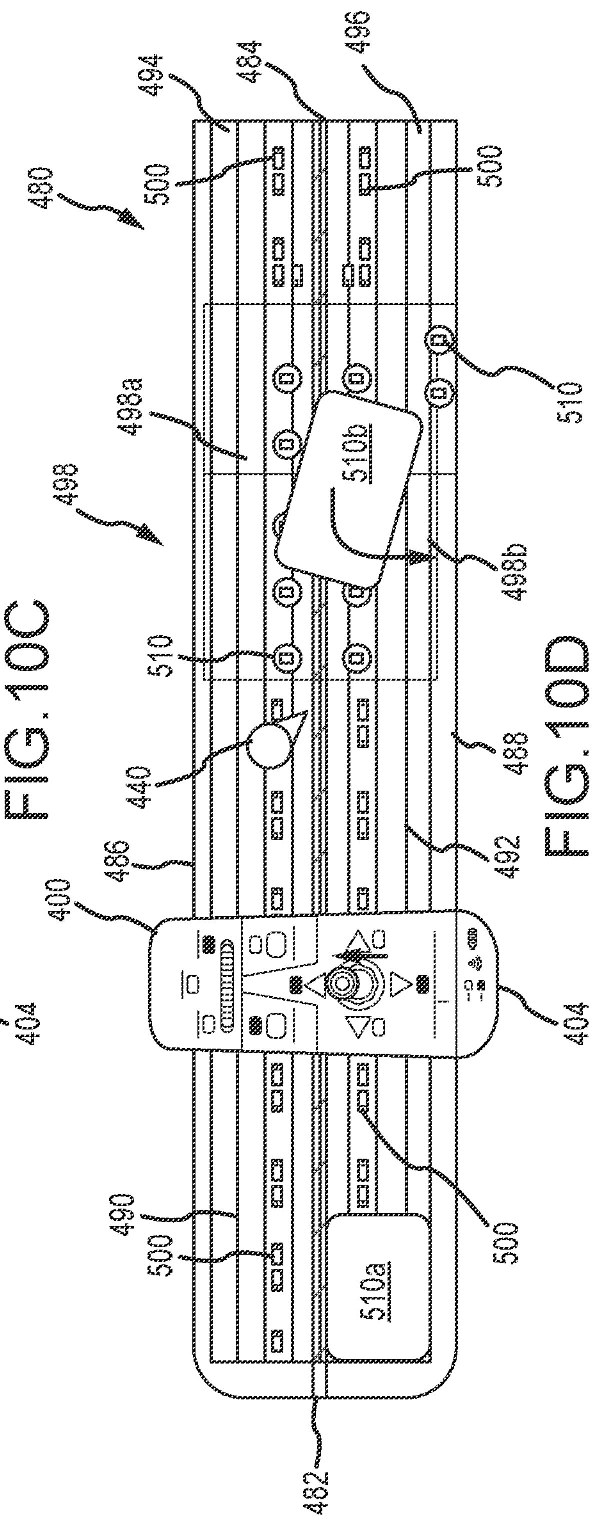
FIG. 10D illustrates operation of a cargo motion controller to continue rotation of the ULD of FIG. 10C into the cargo compartment, in accordance with various embodiments.

FIGS. 10C-10D illustrate another representative sequence for "single operator rotation"—more specifically for a single operator to rotate a ULD into the cargo compartment 480. FIGS. 10C-10D show a ULD 510*a* in the forward-left cargo zone 492 and another ULD 510*b* in the doorway zone 498, with the mobile cargo controller 400 having been configured in accordance with the discussion of FIG. 9A-9E above for such an operation. In each of FIGS. 10C-10D, the cargo zone indicators 420*a*, 420*c* have been activated and with the cargo zone indicators 420*b*, 420*d* being inactive for purposes of conveying that the doorway zone 498 is the active cargo zone (the cargo zone indicator 420*a* being closest to the left side 488 of the cargo compartment 480 (or the left side 488 being in front of the mobile cargo controller 400), the cargo zone indicator 420*c* being closest to the right side 486 of the cargo compartment 480 (or the right side 486 being behind the mobile cargo controller 400), the cargo zone indicator 420*b* (inactive) being closest to the forward end 482 of the cargo compartment 480 (or the forward end 482 being to the right of the mobile cargo controller 400), and the cargo zone indicator 420*d* (inactive) being closest to the aft end 484 of the cargo compartment 480 (or the aft end 484 being to the left of the mobile cargo controller 400)). FIG. 10D each illustrates moving the cargo motion controller 422 in the direction of the aft end 406 of the mobile cargo controller 400 or the right side 486 of the cargo compartment 480 (see corresponding arrow) to rotate the ULD 510*b* in a counterclockwise direction (see corresponding arrow). When the ULD 510*b* has been rotated in the manner of FIGS. 10A-10D to the position of the ULD 510*b* shown in FIG. 11B, the ULD 510*b* can be moved into the forward-left cargo zone 492.

Figure 11A:
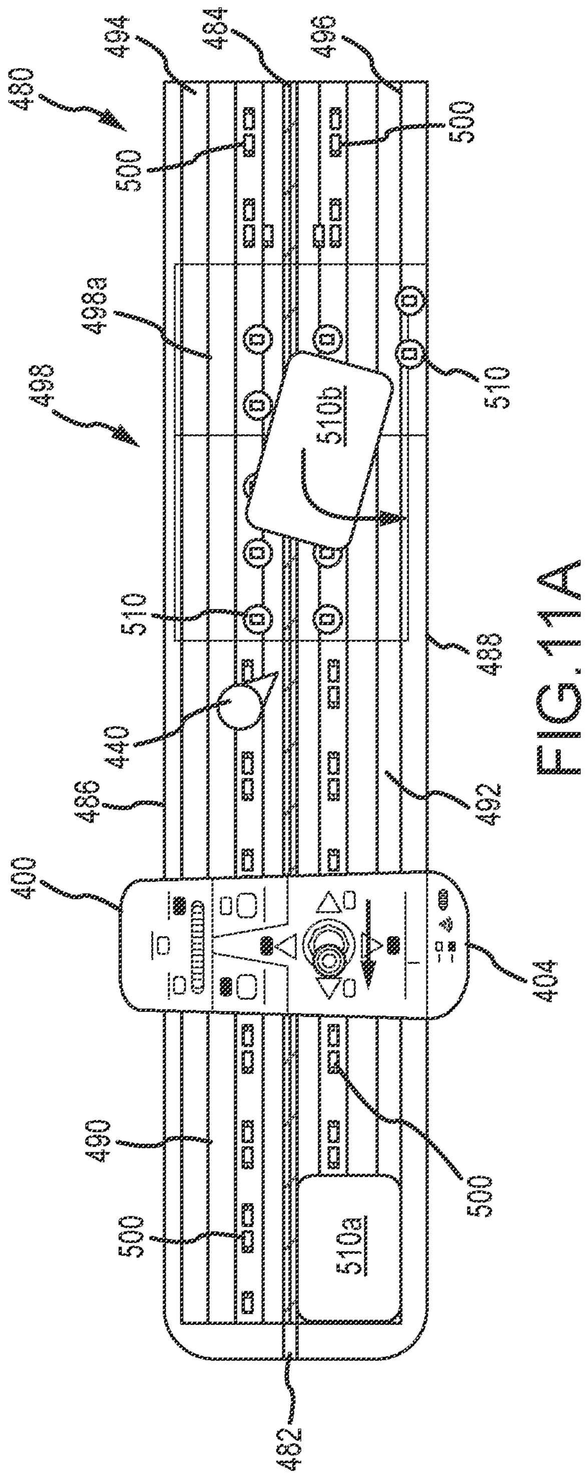
FIG. 11A illustrates the mobile cargo controller of FIG. 4A in the same orientation as FIG. 10D, but a different operation of a cargo motion controller to rotate the ULD into the cargo compartment, in accordance with various embodiments.
Figure 11B:
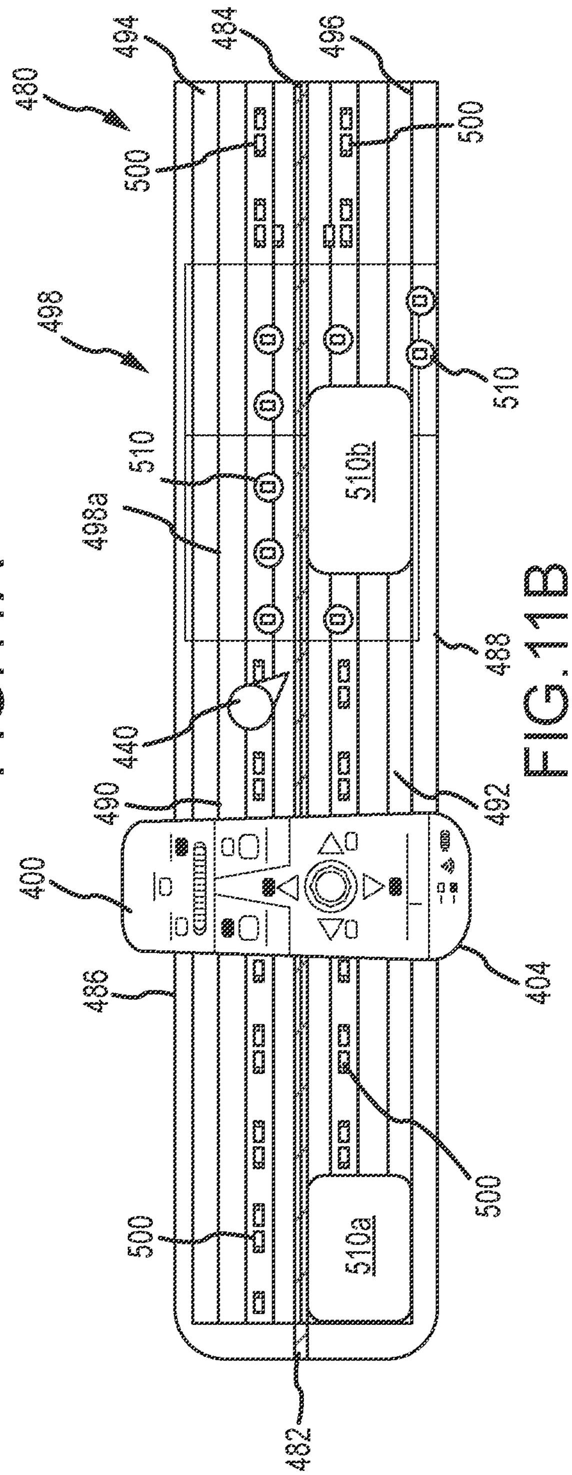
FIG. 11B illustrates an end position of a ULD after having been rotated into the cargo compartment, in accordance with various embodiments.

FIGS. 11A-11B illustrate another representative sequence for "single operator rotation"—more specifically for a single operator to rotate a ULD into the cargo compartment 480. FIGS. 11A-11B show a ULD 510*a* in the forward-left cargo zone 492 and another ULD 510*b* in the doorway zone 498, with the mobile cargo controller 400 having been configured in accordance with the discussion of FIG. 9A-9E above for such an operation. The mobile cargo controller 400 is in the orientation discussed above in relation to FIGS. 10C-10D. FIG. 11A illustrates moving the cargo motion controller 422 in the direction of the right side 408 of the mobile cargo controller 400 or the forward end 482 of the cargo compartment 480 (see corresponding arrow) to rotate the ULD 510*b* in a counterclockwise direction (see corresponding arrow). FIG. 11B illustrates the ULD 510*b* having been fully rotated into the cargo compartment 480, at which time the ULD 510*b* can be moved into the forward-left cargo zone 492.

Figure 12A:
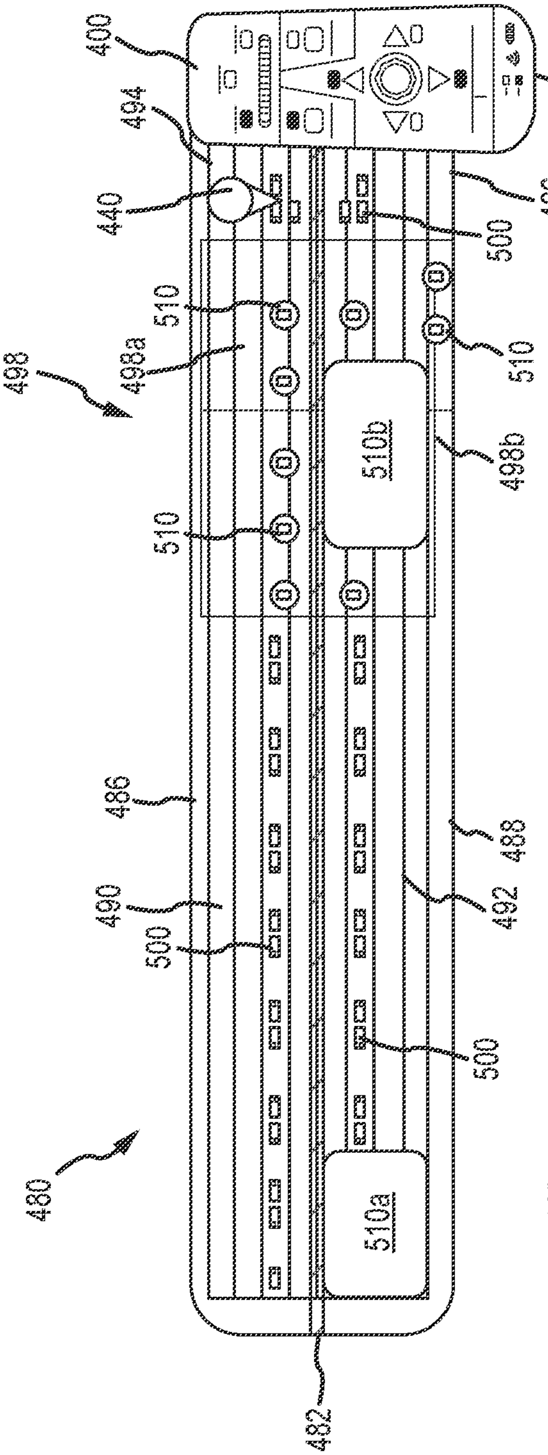
FIG. 12A illustrates active cargo zone indicators for a doorway zone, an active cargo rotation indicator, and with the mobile cargo controller of FIG. 4A being in one orientation, in accordance with various embodiments.
Figure 12B:
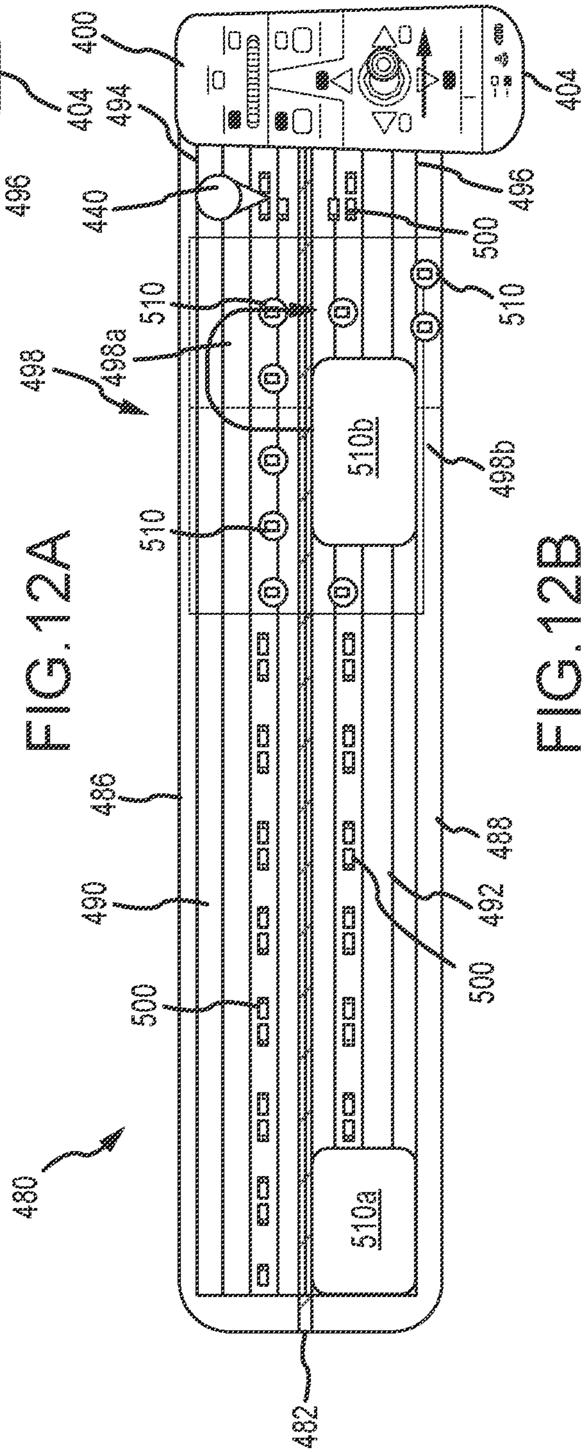
FIG. 12B illustrates one operation of a cargo motion controller to rotate a ULD out of the cargo compartment, in accordance with various embodiments.

FIGS. 12A-12B illustrate a representative sequence for "single operator rotation"-more specifically for a single operator to rotate a ULD out of the cargo compartment 480. FIG. 12A shows a ULD 510*a* in the forward-left cargo zone 492 and another ULD 510*b* in the doorway zone 498. In order to rotate the ULD 510*b* out of the cargo compartment 480: 1) the operator actuates the cargo rotation selector 428 and that activates the cargo rotation indicator 430; and 2) the operator operates the operation selector 432 to select an "unloading" operation and that activates the unloading operation indicator 436. This may be done in any order. Actuation of the cargo rotation selector 428 updates the relevant cargo zone indicators 420*a*-420*d* to show the doorway zone 498 as being the active cargo zone (the cargo zone indicators 420*a*, 420*c* having been activated and with the cargo zone indicators 420*b*, 420*d* being inactive for purposes of conveying that the doorway zone 498 is the active cargo zone (the cargo zone indicator 420*a* being closest to the left side 488 of the cargo compartment 480 (or the left side 488 being in front of the mobile cargo controller 400), the cargo zone indicator 420*c* being closest to the right side 486 of the cargo compartment 480 (or the right side 486 being behind the mobile cargo controller 400), the cargo zone indicator 420*d* (inactive) being closest to the aft end 484 of the cargo compartment 480 (or the aft end 484 being to the left of the mobile cargo controller 400), and the cargo zone indicator 420*b* (inactive) being closest to the forward end 482 of the cargo compartment 480 (or the forward end 482 being to the right of the mobile cargo controller 400)). FIG. 12B illustrates moving the cargo motion controller 422 in the direction of the left side 410 of the mobile cargo controller 400 or the aft end 484 of the cargo compartment 480 (see corresponding arrow) to rotate the ULD 510*b* in a clockwise direction (see corresponding arrow). When the ULD 510*b* has been rotated in this manner to the position shown in FIG. 9D, the ULD 510*b* can be removed from the cargo compartment 480.

Figure 13A:
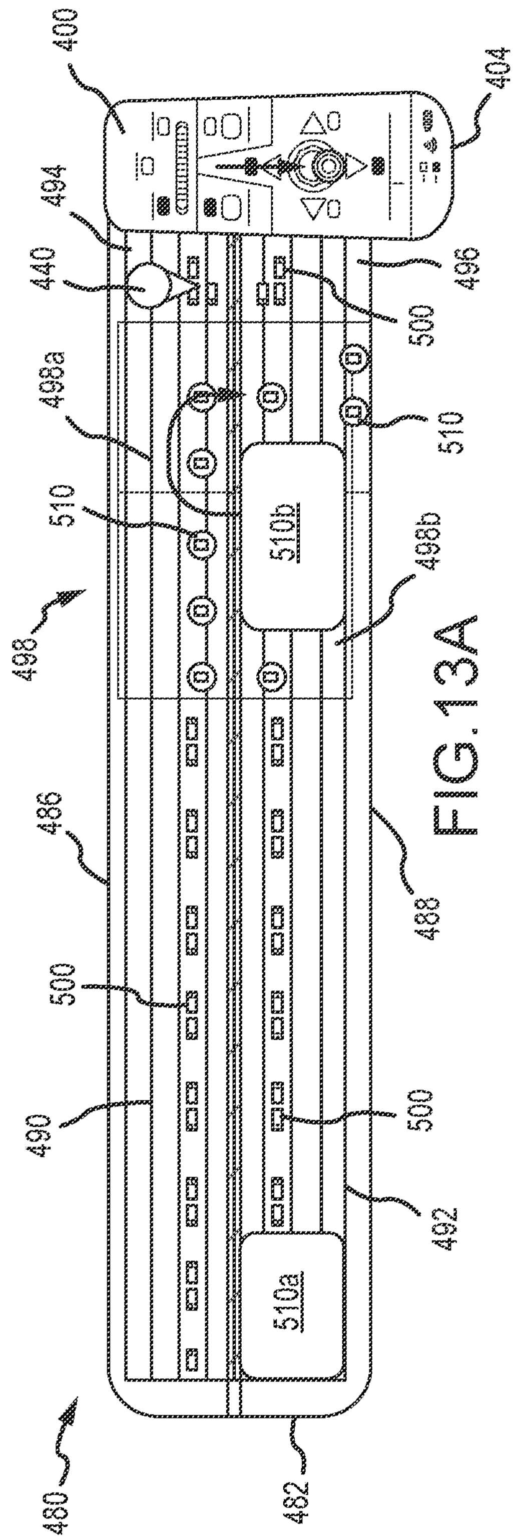
FIGS. 13A and 13B each illustrate a different operation of a cargo motion controller from that shown in FIG. 12B to rotate a ULD out of the cargo compartment, in accordance with various embodiments.
Figure 13B:
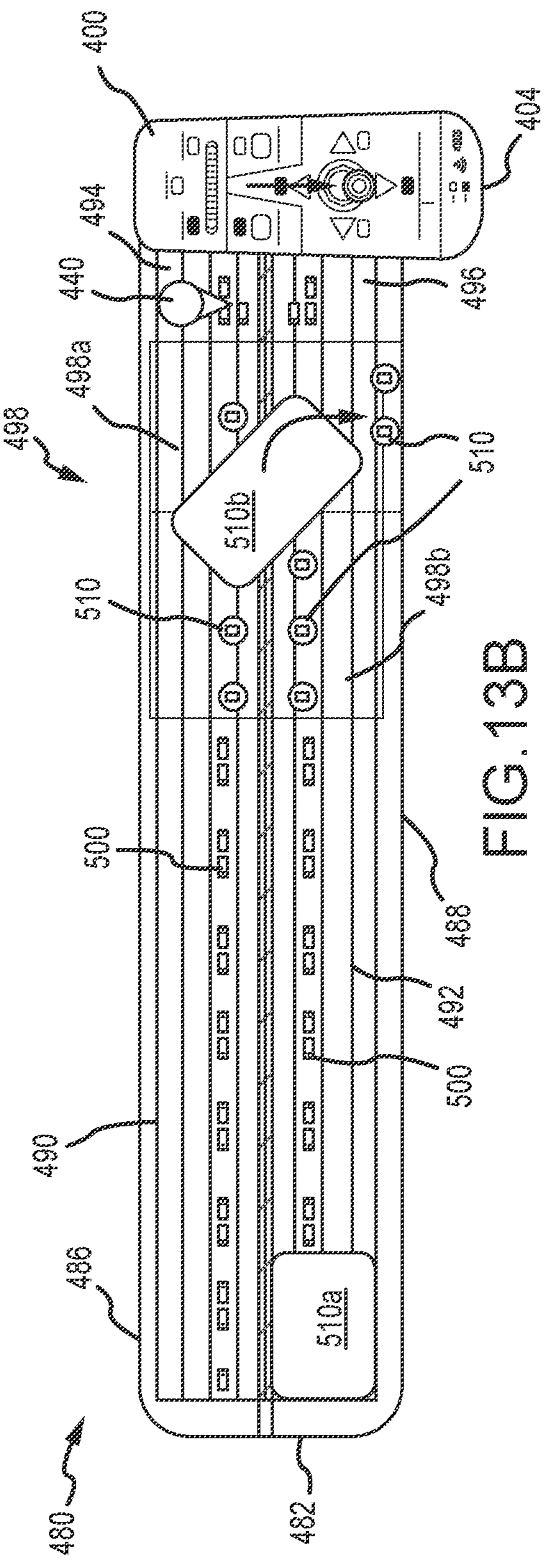

FIGS. 13A-13B illustrate a representative sequence for "single operator rotation"-more specifically for a single operator to rotate a ULD out of the cargo compartment 480. FIG. 13A shows a ULD 510*a* in the forward-left cargo zone 492 and another ULD 510*b* in the doorway zone 498. In order to rotate the ULD 510*b* out of the cargo compartment 480: 1) the operator actuates the cargo rotation selector 428 and that activates the cargo rotation indicator 430; and 2) the operator operates the operation selector 432 to select an "unloading" operation and that activates the unloading operation indicator 436. Actuation of the cargo rotation selector 428 updates the relevant cargo zone indicators 420*a*-420*d* to show the doorway zone 498 as being the active cargo zone (the cargo zone indicators 420*a*, 420*c* having been activated and with the cargo zone indicators 420*b*, 420*d* being inactive for purposes of conveying that the doorway zone 498 is the active cargo zone. The orientation of the mobile cargo controller 400 in FIGS. 13A-13B is the same as FIGS. 12A-12B, so reference may be made to the corresponding discussion above. FIG. 13B illustrates moving the cargo motion controller 422 in the direction of the forward end 404 of the mobile cargo controller 400 or the left side 488 of the cargo compartment 480 (see corresponding arrow) to rotate the ULD 510*b* in a clockwise direction (see corresponding arrow). When the ULD 510*b* has been rotated in this manner to the position shown in FIG. 9D, the ULD 510*b* can be removed from the cargo compartment 480. Note that the orientation of the cargo motion control 422 is the same in FIGS. 13A-13B as in FIGS. 12A-12B discussed above and that the operation of the cargo motion controller 422 in FIGS. 13A-13B is different from that shown in FIGS. 12A-12B discussed above but yet accomplishes the same motion for the ULD 510*b* (i.e., more than one option may exist for operating the cargo motion controller 422 in the same orientation to affect a certain motion of a ULD).

Figure 14A:
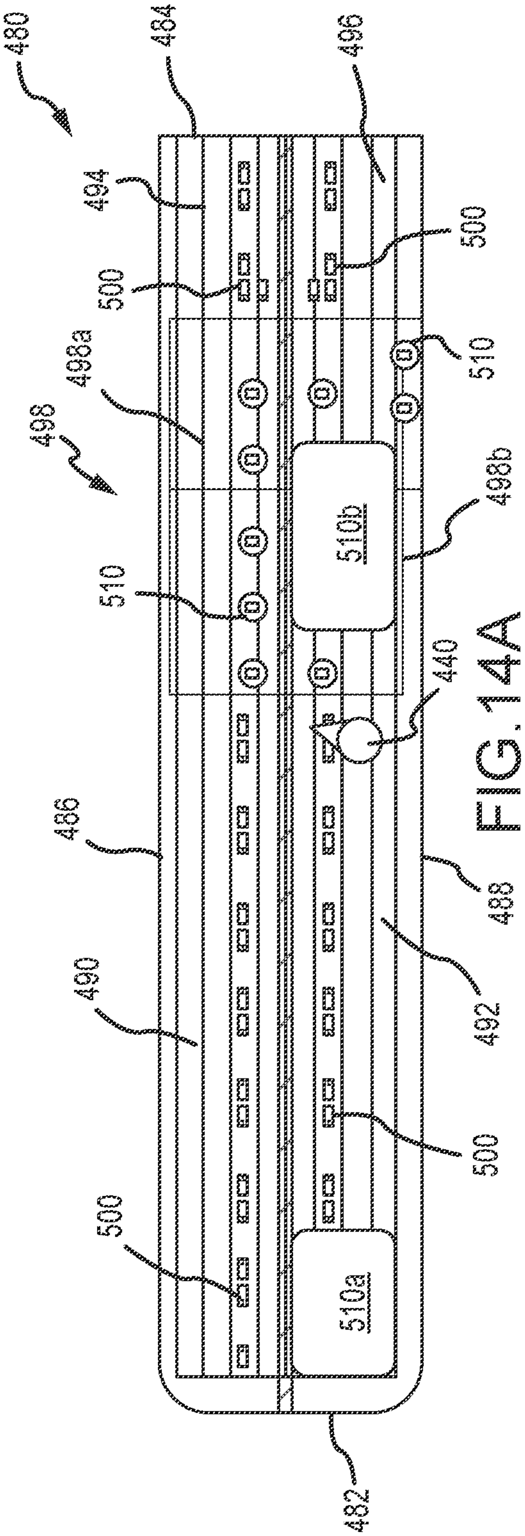
FIG. 14A illustrates a ULD in a doorway zone, in accordance with various embodiments.
Figure 14B:
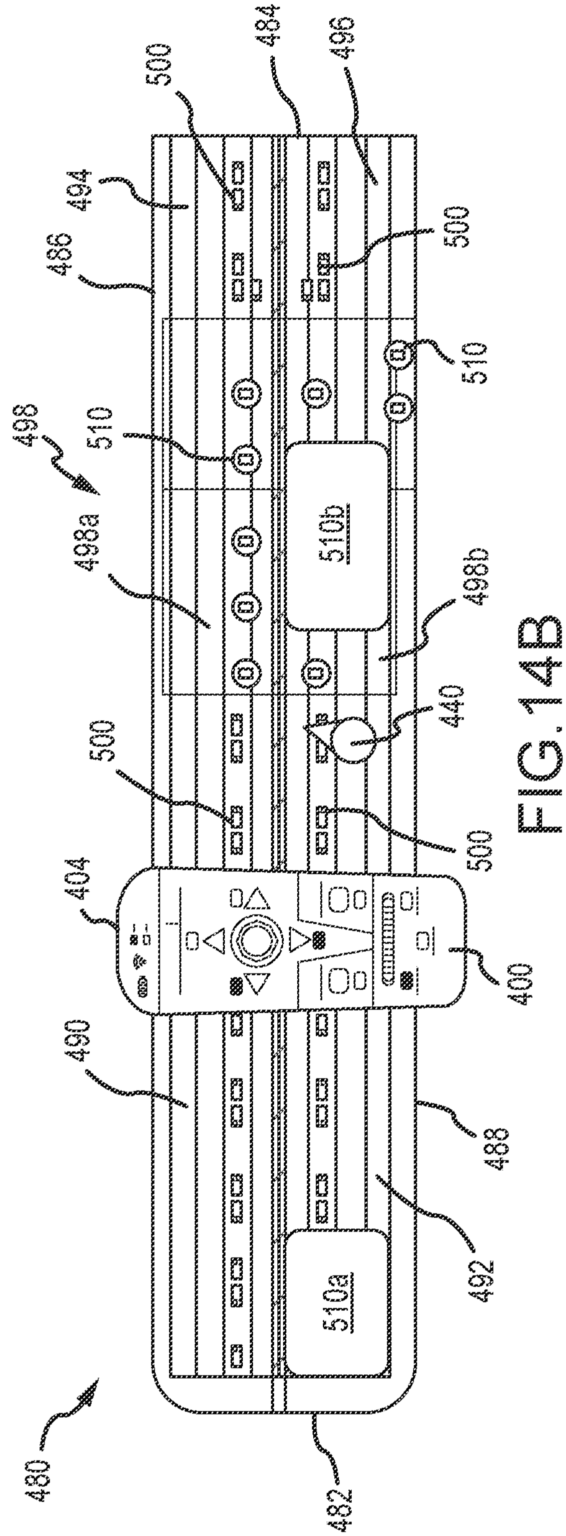
FIG. 14B illustrates active cargo zone indicators for a forward-left cargo zone, in accordance with various embodiments.

FIGS. 14A-14G present a number of views regarding use of the mobile cargo controller 400 in relation to the cargo compartment 480, namely regarding a single operator lateral movement operation (e.g., to move a ULD laterally within the doorway zone 498 for a loading or unloading operation). FIG. 14A is in accord with the discussion of FIG. 5 above, but adds a pair of ULDs 510*a*, 510*b*. ULD 510*a* is in the forward-left cargo zone 492 and ULD 510*b* is in the doorway zone 498*b*. FIG. 14B illustrates the forward-left cargo zone 492 currently being active (the location of the ULD 510*a*) and an orientation for the mobile cargo controller 400 where its forward end 404 points in the direction of the right side 486 of the cargo compartment 480 (the cargo zone indicator 420*d* having been activated and being closest to the forward end 482 of the cargo compartment 480 (or the forward end 482 being to the left of the mobile cargo controller 400), and the cargo zone indicator 420*c* having been activated and being closest to the left side 488 of the cargo compartment 480 (or the left side 488 being behind the mobile cargo controller 400)).

Figure 14C:
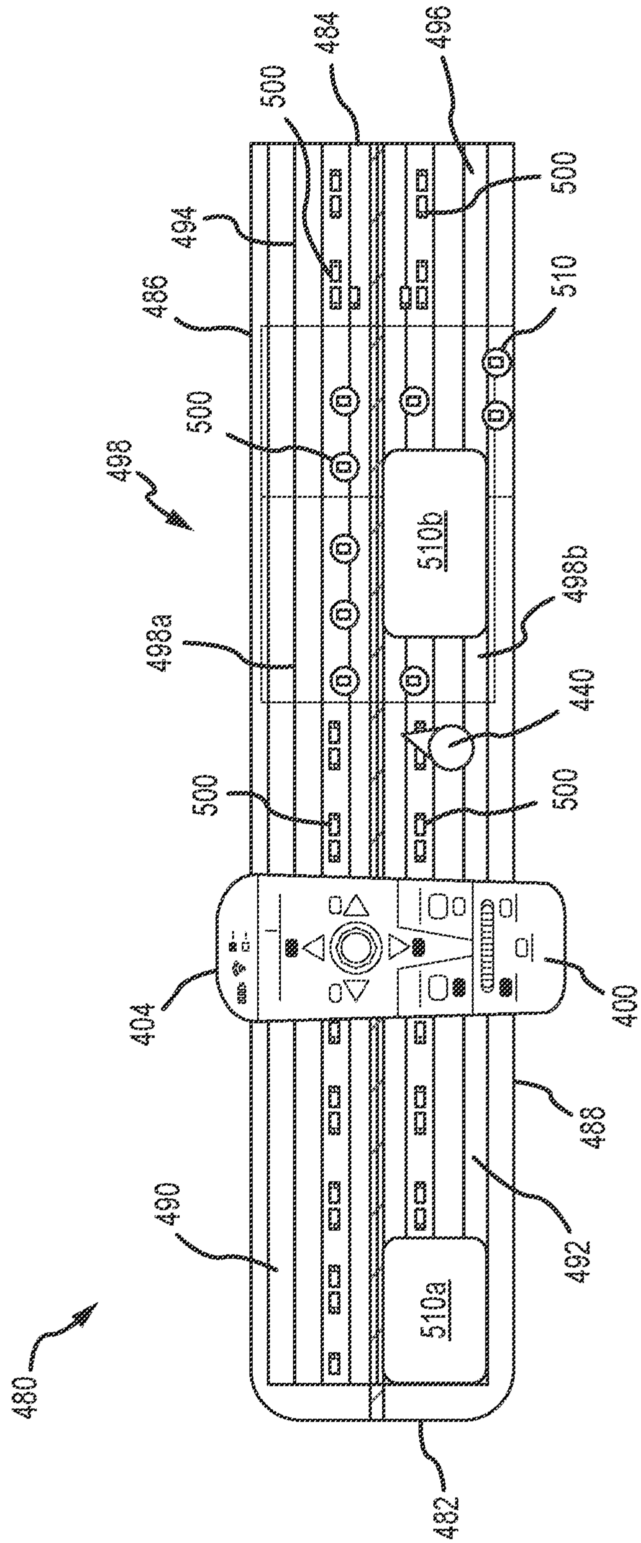
FIG. 14C illustrates active cargo zone indicators for a doorway zone, an active cargo lateral movement indicator, and with the mobile cargo controller of FIG. 4A in one orientation, in accordance with various embodiments.

In order to laterally move the ULD 510*b* from the left doorway zone 498*b* to the right doorway zone 498*a*, the operator actuates the cargo lateral movement selector 424, that activates the cargo lateral movement indicator 426, and that activates the doorway zone 498 as the active cargo zone, all as shown in FIG. 14C. In this regard, FIG. 14C shows the cargo zone indicators 420*a*, 420*c* having been activated and with the cargo zone indicators 420*b*, 420*d* being inactive for purposes of conveying that the doorway zone 498 is now the active cargo zone (the cargo zone indicator 420*a* being closest to the right side 486 of the cargo compartment 480 (or the right side 486 being in front of the mobile cargo controller 400), the cargo zone indicator 420*c* being closest to the left side 488 of the cargo compartment 480 (or the left side 488 being behind the mobile cargo controller 400), the cargo zone indicator 420*d* (inactive) being closest to the forward end 482 of the cargo compartment 480 (or the forward end 482 being to the left of the mobile cargo controller 400), and the cargo zone indicator 420*b* (inactive) being closest to the aft end 484 of the cargo compartment 480 (or the aft end 484 being to the right of the mobile cargo controller 400)).

Figure 14D:
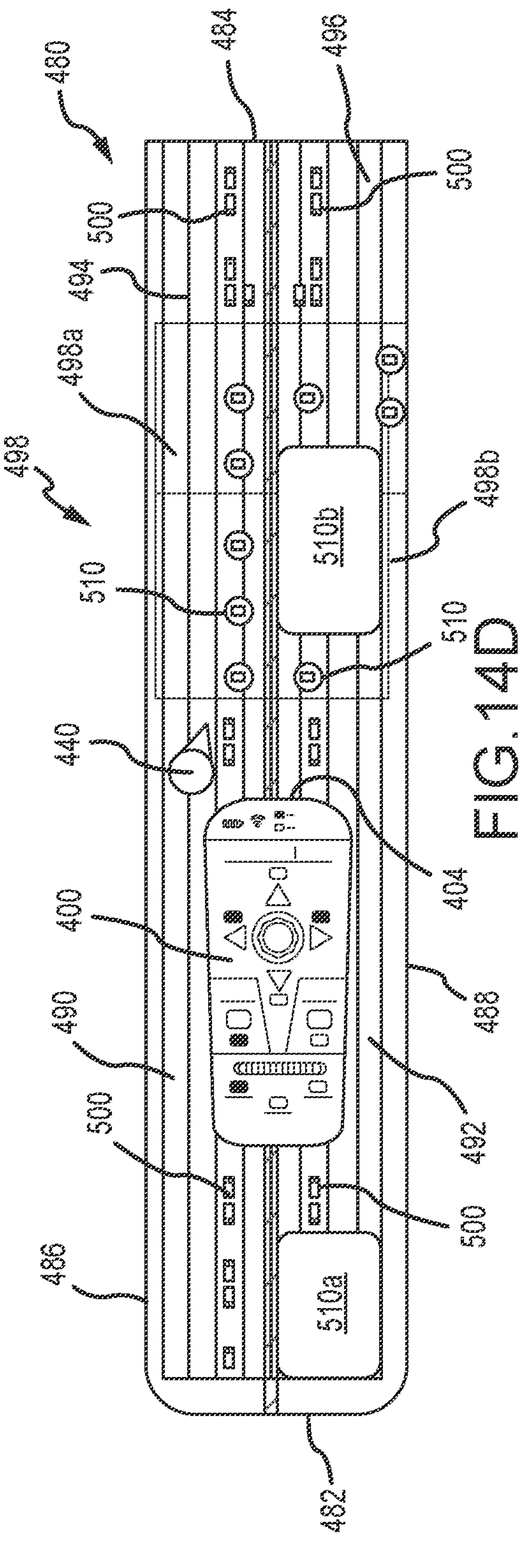
FIG. 14D illustrates active cargo zone indicators for a doorway zone, an active cargo lateral movement indicator, and with the mobile cargo controller of FIG. 4A in a different orientation compared to FIG. 14C, in accordance with various embodiments.
Figure 14E:
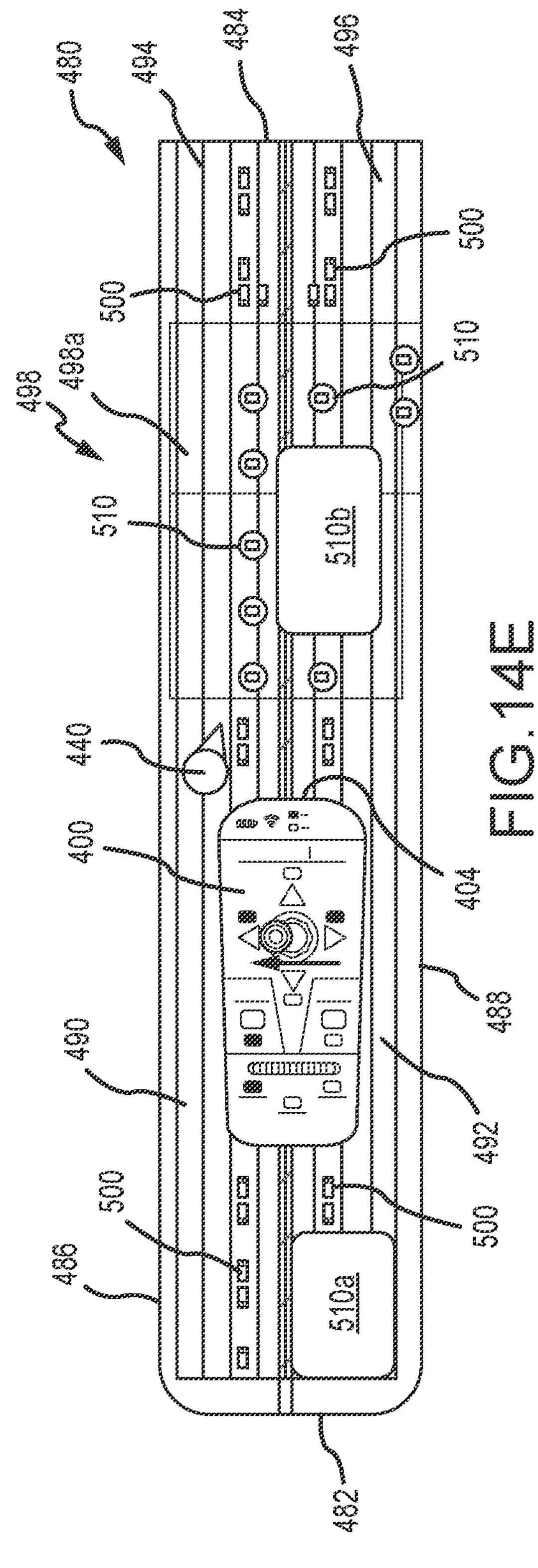
FIGS. 14E and 14F each illustrate one operation of a cargo motion controller to laterally move the ULD within the doorway zone, in accordance with various embodiments.

FIG. 14D illustrates a change of orientation for the mobile cargo controller 400 compared to FIG. 14E (after a lateral movement operation has been input to the mobile cargo controller 400 in accordance with the foregoing), and where its forward end 404 now points in the direction of the aft end 484 of the cargo compartment 480. Note that the doorway zone 498 is still indicated on the mobile cargo controller 400 as being the active cargo zone (the cargo zone indicator 420*d* (active) being closest to the right side 486 of the cargo compartment 480 (or the right side 486 being to the left of the mobile cargo controller 400), the cargo zone indicator 420*b* being closest to the left side 488 of the cargo compartment 480 (or the left side 488 being to the right of the mobile cargo controller 400), the cargo zone indicator 420*c* (inactive) being closest to the forward end 482 of the cargo compartment 480 (or the forward end 482 being behind the mobile cargo controller 400), and the cargo zone indicator 420*a* (inactive) being closest to the aft end 484 of the cargo compartment 480 (or the aft end 484 being in front of the mobile cargo controller 400)).

Figure 14F:
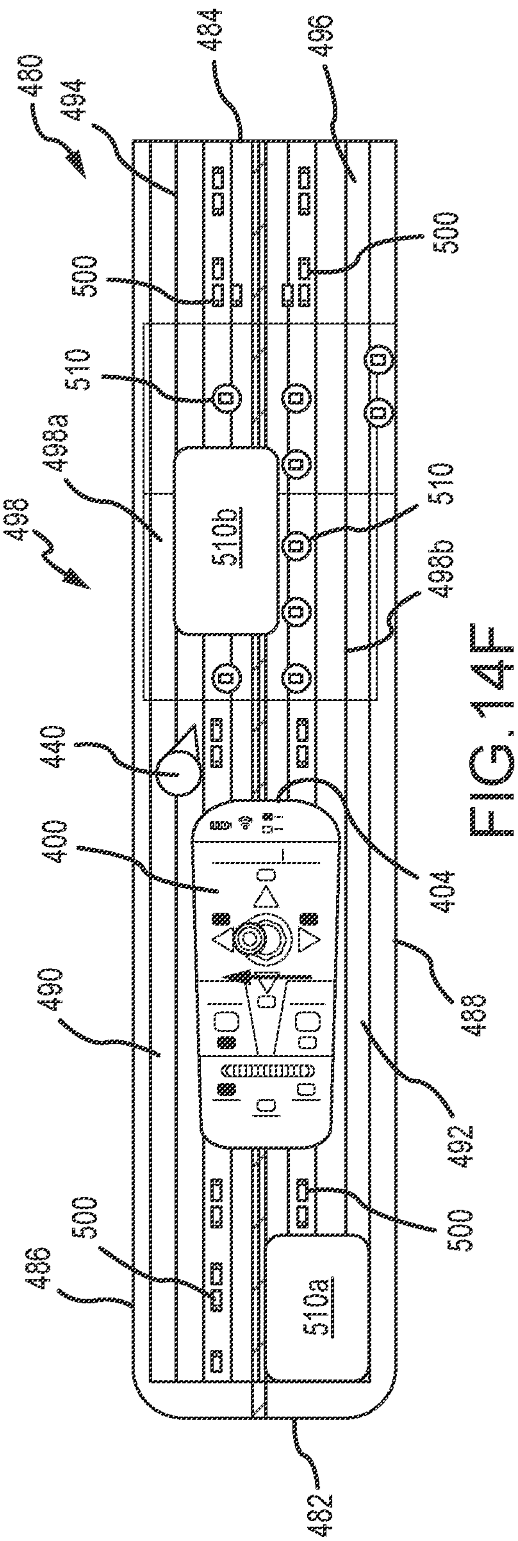
Figure 14G:
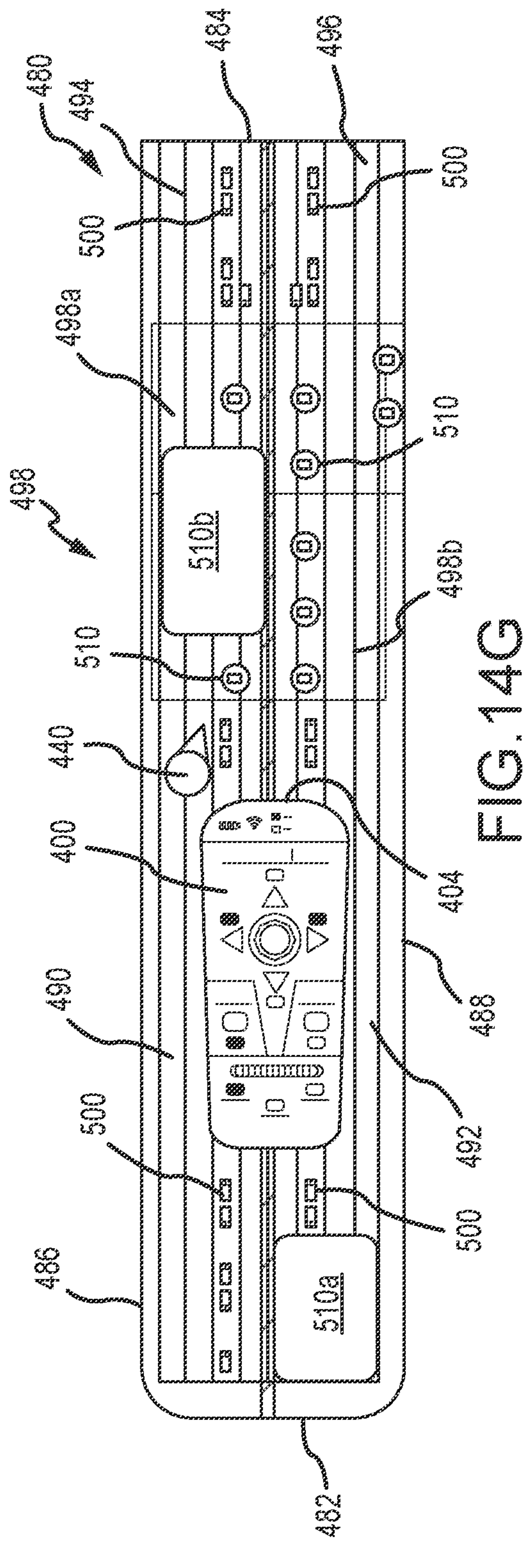
FIG. 14G illustrates an end position of a ULD after having been laterally moved in the doorway zone, in accordance with various embodiments.

FIGS. 14E and 14F illustrates moving the cargo motion controller 422 in the direction of the left side 410 of the mobile cargo controller 400 or the right side 486 of the cargo compartment 480 (see corresponding arrow) to laterally move the ULD 510*b* from the left doorway zone 498*b* to the right doorway zone 498*a* (see corresponding arrow). This movement is along an at least generally axial path and is affected by the FCTs 502. FIG. 14G illustrates the end position of the ULD 510*b* in the right doorway zone 498*a*, where the ULD 510*b* now may be moved into the forward-right cargo zone 490 or the aft-right cargo zone 494. The discussion presented may of course be adapted to move a ULD from the right doorway zone 498*a* to the left doorway zone 498*b* for an unloading operation.

Based upon the foregoing, it should be appreciated that the selection of an active cargo zone(s) using the mobile cargo controller 400 (through activation of one or more of the cargo zone selectors 418*a*-418*d* of the mobile cargo controller 400) is based upon the orientation of the mobile cargo controller 400 within the cargo compartment 480 (e.g., of an aircraft). The selection of the active cargo zone(s) through the mobile cargo controller 400 also provides visual feedback to an operator (via activation of the relevant cargo zone indicators 420*a*-420*d* on the mobile cargo controller 400) as to the current active cargo zone(s), and this visual feedback is also relative to the orientation of the controller 400 within the cargo compartment 480. Visual feedback on the mobile cargo controller 400 is updated as the operator moves throughout the cargo compartment 480 so that the active cargo zone(s) is consistently presented to the operator in relation to the orientation of the mobile cargo controller 400 within the cargo compartment 480.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A mobile cargo controller for a cargo handling system, comprising:
- at least one inertial measurement unit;
- a plurality of cargo zone selectors, wherein different combinations of one or more cargo zone selectors of said plurality of cargo zone selectors are activatable to correspond with different cargo zones of a cargo compartment;
- a plurality of cargo zone indicators, wherein each said cargo zone selector of said plurality of cargo zone selectors has a corresponding cargo zone indicator of said plurality of cargo zone indicators; and
- at least one cargo motion controller.

2. The mobile cargo controller of claim 1, wherein said at least one inertial measurement unit comprises at least one accelerometer and at least one gyroscope.

3. The mobile cargo controller of claim 1, wherein said at least one cargo motion controller comprises a single cargo motion controller.

4. The mobile cargo controller of claim 1, wherein said at least one cargo motion controller is configured to provide proportional velocity control on a directional basis.

5. The mobile cargo controller of claim 1, wherein each cargo zone selected through activation of one or more of said cargo zone selectors in turn activates each corresponding said cargo zone indicator based upon a current orientation of said mobile cargo controller.

6. The mobile cargo controller of claim 1, wherein each said cargo zone selector of said plurality of cargo zone selectors comprises a different actuator.

7. The mobile cargo controller of claim 1, wherein said plurality of cargo zone selectors comprises four said cargo zone selectors.

8. The mobile cargo controller of claim 1, wherein each said cargo zone indicator comprises an activatable light source.

9. The mobile cargo controller of claim 1, further comprising:
- an operation selector;
- a plurality of operation indicators, wherein said operation selector is used to select an operation associated with one of said plurality of operation indicators, wherein each operation indicator of said plurality of operation indicators comprises an activatable light source;
- wherein said plurality of operation indicators comprise a loading operation indicator and an unloading operation indicator.

10. The mobile cargo controller of claim 1, further comprising:
- a cargo rotation selector, wherein said cargo rotation selector comprises an actuator;
- a cargo rotation indicator, wherein said cargo rotation indicator comprises an activatable light source;
- wherein said cargo rotation selector is associated with control of a doorway zone.

11. The mobile cargo controller of claim 1, further comprising:
- a cargo lateral movement selector, wherein said cargo lateral movement selector comprises an actuator;
- a cargo lateral movement indicator, wherein said cargo lateral movement indicator comprises an activatable light source;
- wherein said cargo lateral movement selector is associated with control of a doorway zone.

12. A method of controlling a cargo handling system, said method comprising:

selecting a selected cargo zone from a plurality of cargo zone selectors presented on a mobile cargo controller, wherein said selecting is based upon a first orientation of said mobile cargo controller relative to said plurality of cargo zone selectors;

activating said selected cargo zone in response to said selecting;

activating a first combination of a plurality of cargo zone indicators on said mobile cargo controller to identify said selected cargo zone based upon said first orientation of said mobile cargo controller, wherein said first combination comprises at least one cargo zone indicator of said plurality of cargo zone indicators; and operating at least one cargo motion controller of said mobile cargo controller, wherein said operating controls motion of cargo within said selected cargo zone.

13. The method of claim 12, wherein different combinations of one or more cargo zone selectors of said plurality of cargo zone selectors are activatable to correspond with different cargo zones of a cargo compartment, wherein a first cargo zone selector of said plurality of cargo zone selectors is toward a forward end of said mobile cargo controller, wherein a second cargo zone selector of said plurality of cargo zone selectors is toward a right side of said mobile cargo controller, wherein a third cargo zone selector of said plurality of cargo zone selectors is toward a rear end of said mobile cargo controller, and wherein a fourth cargo zone selector of said plurality of cargo zones is toward a left side of said mobile cargo controller.

14. The method of claim 12, wherein different combinations of one or more cargo zone selectors of said plurality of cargo zone selectors are activatable to correspond with different cargo zones of a cargo compartment, wherein one of said plurality of cargo zone selectors corresponds with a forward direction for said first orientation of said mobile cargo controller, wherein another of said plurality of cargo zone selectors corresponds with a right direction for said first orientation of said mobile cargo controller, wherein another of said plurality of cargo zone selectors corresponds with a rearward direction for said first orientation of said mobile cargo controller, and wherein another of said plurality of cargo zone selectors corresponds with a left direction for said first orientation of said mobile cargo controller.

15. The method of claim 12, wherein different combinations of one or more cargo zone selectors of said plurality of cargo zone selectors are activatable to correspond with different cargo zones of a cargo compartment, wherein a first cargo zone selector of said plurality of cargo zone selectors corresponds with a forward direction for said first orientation of said mobile cargo controller, wherein a second cargo zone selector of said plurality of cargo zone selectors corresponds with a right direction for said first orientation of said mobile cargo controller, wherein a third cargo zone selector of said plurality of cargo zone selectors corresponds with an aft direction for said first orientation of said mobile cargo controller, and wherein a fourth cargo zone selector of said plurality of cargo zones corresponds with a left direction for said first orientation of said mobile cargo controller, said method further comprising:

changing an orientation of said mobile cargo compartment from said first orientation to a second orientation; and activating a second combination of said plurality of cargo zone indicators to identify said selected cargo zone on said mobile cargo controller based upon said second orientation, wherein said second combination is different from said first combination and comprises at least one said cargo zone indicator of said plurality of cargo zone indicators.

16. The method of claim 15, wherein said plurality of cargo zone selectors consist essentially of said first cargo zone selector, said second cargo zone selector, said third cargo zone selector, and said fourth cargo zone selector;

wherein said first cargo zone selector and said third cargo zone selector are oppositely disposed on said mobile cargo controller, and wherein said second cargo zone selector and said fourth cargo zone selector are oppositely disposed on said mobile cargo controller; and wherein said first cargo zone selector, said second cargo selector, said third cargo zone selector, and said fourth cargo zone selector are presented in this order on said mobile cargo controller and are disposed about a joystick, wherein said at least one cargo motion controller comprises said joystick.

17. The method of claim 12, further comprising determining an orientation of said mobile cargo controller using at least one inertial measurement unit, wherein said mobile cargo controller comprises said at least one inertial measurement unit.

18. The method of claim 12, further comprising:

identifying a condition that is associated with a dropping of said mobile cargo controller; and at least temporarily deactivating a current cargo moving operation using said mobile cargo controller.

19. The method of claim 12, further comprising:

activating a cargo rotation selector on said mobile cargo controller, wherein said operating at least one cargo motion controller comprises rotating said cargo within a doorway zone.

20. The method of claim 12, further comprising:

activating a cargo lateral movement selector on said mobile cargo controller, wherein said operating at least one cargo motion controller comprises moving said cargo from a first doorway zone to a second doorway zone.

* * * * *